United States Patent
Krishan et al.

(10) Patent No.: US 11,652,783 B1
(45) Date of Patent: May 16, 2023

(54) METHODS, SYSTEMS, AND COMPUTER READABLE MEDIA FOR PROVIDING NETWORK FUNCTION (NF) REPOSITORY FUNCTION (NRF) WITH CONFIGURABLE PRODUCER NF INTERNET PROTOCOL (IP) ADDRESS MAPPING

(71) Applicant: Oracle International Corporation, Redwood Shores, CA (US)

(72) Inventors: Rajiv Krishan, Bangalore (IN); Amarnath Jayaramachar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/672,646

(22) Filed: Feb. 15, 2022

(51) Int. Cl.
| | |
|---|---|
| *G06F 15/16* | (2006.01) |
| *H04L 61/4511* | (2022.01) |
| *H04W 48/18* | (2009.01) |
| *H04W 8/26* | (2009.01) |
| *H04L 61/5046* | (2022.01) |

(52) U.S. Cl.
CPC ...... *H04L 61/4511* (2022.05); *H04L 61/5046* (2022.05); *H04W 8/26* (2013.01); *H04W 48/18* (2013.01)

(58) Field of Classification Search
CPC .. H04L 61/4511; H04L 61/5046; H04W 8/26; H04W 48/18
USPC ................................................ 709/203, 245
See application file for complete search history.

(56) References Cited

U.S. PATENT DOCUMENTS

| | | | | |
|---|---|---|---|---|
| 11,356,934 B2* | 6/2022 | Reyes | ............... | H04W 64/003 |
| 11,576,031 B2* | 2/2023 | Puente Pestaña | ....... | H04W 8/18 |
| 2019/0230556 A1* | 7/2019 | Lee | ..................... | H04W 28/16 |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

(Continued)

*Primary Examiner* — Duyen M Doan
(74) *Attorney, Agent, or Firm* — Jenkins, Wilson, Taylor & Hunt, P.A.

(57) ABSTRACT

A method for supporting configurable producer network function (NF) Internet protocol (IP) address mappings includes, at an NF repository function (NRF), receiving, from a requesting node, a request message for network address and/or service information of a producer NF. The method further includes determining, from the request message, at least one consumer NF parameter. The method further includes using the at least one consumer NF parameter, a producer NF IP address mapping rule. The method further includes, in response to locating the producer NF IP address mapping rule, determining, using the producer NF IP address mapping rule, an IP address to return to the requesting node. The method further includes generating a response message including the IP address and transmitting the response message to the requesting node.

20 Claims, 18 Drawing Sheets

(56) References Cited

OTHER PUBLICATIONS

"Use DNS Policy for Geo-Location Based Traffic Management with Primary Servers," Microsoft Docs, pp. 1-8 (Sep. 20, 2021).
Belshe et al., "Hypertext Transfer Protocol Version 2 (HTTP/2)," Internet Engineering Task Force (IETF), Request for Comments: 7540, pp. 1-96 (May 2015).

* cited by examiner

METHODS, SYSTEMS, AND COMPUTER READABLE MEDIA FOR PROVIDING NETWORK FUNCTION (NF) REPOSITORY FUNCTION (NRF) WITH CONFIGURABLE PRODUCER NF INTERNET PROTOCOL (IP) ADDRESS MAPPING

TECHNICAL FIELD

The subject matter described herein relates to facilitating efficient communications in 5G and other networks in which service discovery and domain name system (DNS) translation are supported. More particularly, the subject matter described herein relates to providing an NRF with configurable producer NF IP address mappings, including support for selecting from plural IP addresses configured for the same producer NF and selecting network address translated (NATed) IP addresses.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance. Thus, it is desirable for consumer NFs to be able to formulate NF discovery requests with query parameters that are optimized for locating producer NFs that are capable of and best suited for providing a service requested by the consumer NFs.

A service communication proxy (SCP) can also invoke the NF discovery service operation to learn about available producer NF instances. The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that the NF profile of a producer NF may include multiple IP addresses and a consumer NF may need to select one of the IP addresses used to reach the producer NF. One possible solution to this problem is to have the consumer NF receive the NF profile including multiple IP addresses and implement custom logic to select a routable IP address from the multiple IP addresses in the NF profile. This solution is undesirable as it requires custom logic on each consumer NF, and consumer NFs that run the same custom logic may end up selecting the same IP address, which could lead to a bottleneck in the network.

Another problem associated with IP addresses of NF profiles is the need for network address translation (NAT). A network operator may need to configure network address translation so that the producer NF can return different network address translated IP addresses to consumer NFs located in different sites or localities. Possible solutions to this problem include placing network address translators in each individual locality or network, having the consumer NF perform network address translation when connecting to the producer NF in each subnet, or having producer NFs provide multiple network address translated IP addresses in the NF profile. None of these solutions are scalable.

Yet another problem the loaded to producer NF IP addressing is how to provide localized DNS support in different sites or localities. The multiple IP address and/or network address translation problem can be solved by providing locality based DNS support in each site or locality. In such a situation, a producer NF may publish a fully qualified domain name (FQDN) in its NF profile, and a localized DNS server may translate the FQDN based on the locality of the requester. However, the solution may lead to operational challenges, such as keeping DNS records up to date.

Accordingly, in light of these and other difficulties, there exists a need for and NRF with configurable producer NF IP address mapping support.

SUMMARY

A method for supporting configurable producer network function (NF) Internet protocol (IP) address mappings includes, at an NF repository function (NRF), receiving, from a requesting node, a request message for network address and/or service information of a producer NF. The method further includes determining, from the request message, at least one consumer NF parameter. The method further includes using the at least one consumer NF parameter, a producer NF IP address mapping rule. The method further includes, in response to locating the producer NF IP address mapping rule, determining, using the producer NF IP address mapping rule, an IP address to return to the requesting node. The method further includes generating a response message including the IP address and transmitting the response message to the requesting node.

According to another aspect of the subject matter described herein, receiving the request message includes receiving an NF discovery request message and determining the IP address to return to the requesting node includes locating an NF profile of the producer NF using at least one query parameter from the NF discovery request message and using the producer NF IP address mapping rule to select the IP address from the NF profile.

According to another aspect of the subject matter described herein, using the producer NF IP address mapping rule to select the IP address includes selecting the IP address from plural IP addresses included in the NF profile.

According to another aspect of the subject matter described herein, using the producer NF IP address mapping rule to select the IP address includes using the producer NF IP address mapping rule to select a network address translated IP address as the IP address to return to the requesting node.

According to another aspect of the subject matter described herein, locating the IP address mapping rule using the at least one consumer NF attribute includes locating the IP address mapping rule using at least one attribute obtained from an NF profile of the consumer NF or a source address of the request message.

According to another aspect of the subject matter described herein, the requesting node comprises a consumer NF or a service communication proxy (SCP).

According to another aspect of the subject matter described herein, receiving the request message includes receiving a domain name system (DNS) resolution request message and determining the IP address to return to the requesting node includes locating an NF profile of the producer NF using an NF instance identifier mapped to a fully qualified domain name (FQDN) in the DNS resolution request message and using the producer NF IP address mapping rule to select the IP address from the NF profile.

According to another aspect of the subject matter described herein, locating the IP address mapping rule using a consumer NF parameter includes locating the IP address mapping rule using a source IP address of the DNS resolution request message.

According to another aspect of the subject matter described herein, receiving the DNS resolution request message from the requesting node includes receiving the DNS resolution request message from a consumer NF, and SCP, or a DNS server.

According to another aspect of the subject matter described herein, determining the IP address includes selecting the IP address from a plurality of IP addresses included in the NF profile or selecting a network address translated IP address from the NF profile.

According to another aspect of the subject matter described herein, a system for supporting configurable producer network function (NF) Internet protocol (IP) address mappings. The system includes an NF repository function (NRF) including at least one processor and a memory for receiving, from a requesting node, a request message for network address and/or service information of a producer NF. The system includes a producer NF IP address mapper for determining, from the request message, at least one consumer NF parameter, locating, using the at least one consumer NF parameter, a producer NF IP address mapping rule, in response to locating the producer NF IP address mapping rule, determining, using the producer NF IP address mapping rule, an IP address to return to the requesting node. The system further includes a response generator implemented by the at least one processor for generating a response message including the IP address and transmitting the response message to the requesting node.

According to another aspect of the subject matter described herein, the request message includes an NF discovery request message and the producer NF IP address mapper is configured to determine the IP address to return to the requesting node by locating an NF profile of the producer NF using at least one query parameter from the NF discovery request message and using the producer NF IP address mapping rule to select the IP address from the NF profile.

According to another aspect of the subject matter described herein, the producer NF IP address mapper is configured use the producer NF IP address mapping rule to select the IP address from plural IP addresses included in the NF profile.

According to another aspect of the subject matter described herein, the producer NF IP address mapper is configured to use the producer NF IP address mapping rule to select a network address translated IP address as the IP address to return to the requesting node.

According to another aspect of the subject matter described herein, the producer NF IP address mapper is configured to locate the IP address mapping rule using at least one attribute obtained from an NF profile of the consumer NF or a source address of the request message.

According to another aspect of the subject matter described herein, the request message includes a domain name system (DNS) resolution request message and the producer NF IP address mapper is configured to determine the IP address to return to the requesting node by locating an NF profile of the producer NF using an NF instance identifier mapped to a fully qualified domain name (FQDN) in the DNS resolution request message and using the producer NF IP address mapping rule to select the IP address from the NF profile.

According to another aspect of the subject matter described herein, the producer NF IP address mapper is configured to locate to IP address mapping rule using a source IP address of the DNS resolution request message.

According to another aspect of the subject matter described herein, the requesting node comprises a consumer NF, a service communication proxy (SCP), or a DNS server.

According to another aspect of the subject matter described herein, the IP address includes selecting the IP address from a plurality of IP addresses included in the NF profile or selecting a network address translated IP address from the NF profile.

According to another aspect of the subject matter described herein, a non-transitory computer readable medium having stored thereon executable instructions that when executed by a processor of a computer control the computer to perform steps at a network function (NF) repository function (NRF). The steps include receiving, from a requesting node, a request message for network address and/or service information of a producer NF. The steps further include determining, from the request message, at least one consumer NF parameter. The steps further include locating, using the at least one consumer NF parameter, a producer NF IP address mapping rule. The steps further include, in response to locating the producer NF IP address mapping rule determining, using the producer NF IP address mapping rule, an IP address to return to the requesting node. The steps further include generating a response message including the IP address. The steps further include transmitting the response message to the requesting node.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
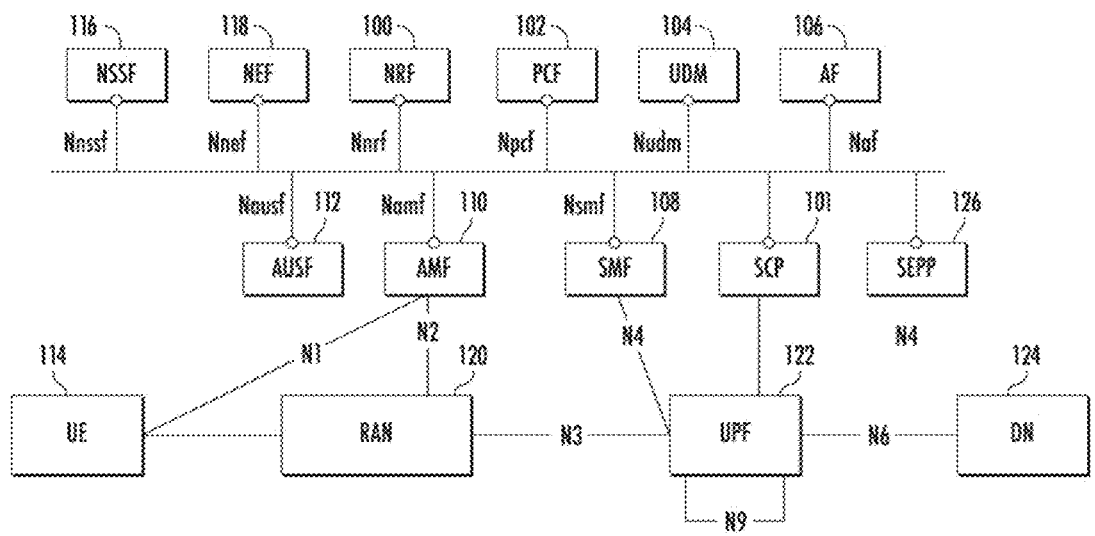
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, problems that can occur in 5G and other networks where service discovery and DNS are supported include selecting a producer NF IP address when a producer NF supports multiple IP addresses, performing network address translation for producer NF IP addresses, and performing DNS resolution in a manner that addresses either or both of the first two problems. 3GPP TS 29.510 allows producer NFs to register an NF profile or a service profile that includes an FQDN and/or multiple IPv4 or IPv6 addresses. Tables 1 and 2 respectively illustrate portions of the NF profile and the service profile that include the FQDN and IP address related attributes. Table 3 defines the IpEndPoint attribute of the service profile.

TABLE 1

NF Profile Attributes Relating to IP Addressing

| fqdn | Fqdn | C | 0..1 | FQDN of the Network Function (NOTE 1) (NOTE 2) (NOTE 18). For AMF, the FQDN registered with the NRF shall be that of the AMF Name (see 3GPP TS 23.003 [12] clause 28.3.2.5). |
|---|---|---|---|---|
| interPlmnFqdn | Fqdn | C | 0..1 | If the NF needs to be discoverable by other NFs in a different PLMN, then an FQDN that is used for inter-PLMN routing as specified in 3GPPTS 23.003 [12] shall be registered with the NRF (NOTE 8). A change of this attribute shall result in triggering a "NF_PROFILE_CHANGED" notification from NRF towards subscribing NFs located in the same or a different PLMN, but in the latter case the new value shall be notified as a change of the "fqdn" attribute. |
| ipv4Addresses | array (Ipv4Addr) | C | 1..N | IPv4 address(es) of the Network Function (NOTE 1) (NOTE 2) (NOTE 18) |
| ipv6Addresses | array (Ipv6Addr) | C | 1..N | IPv6 address(es) of the Network Function (NOTE 1) (NOTE 2) (NOTE 18) |

TABLE 2

IP Address Related Attributes of Service Profile

| fqdn | Fqdn | O | 0..1 | FQDN of the NF Service Instance (NOTE 1) (NOTE 8) (NOTE 14) The FQDN provided as part of the NFService information has precedence over the FQDN and IP addresses provided as part of the NFProfile information (see clause 6.1.6.2.2). |
|---|---|---|---|---|
| interPlmnFqdn | Fqdn | O | 0..1 | If the NF service needs to be discoverable by other NFs in a different PLMN, then an FQDN that is used for interring PLMN routing as specified in 3GPP TS 23.003 [12] may be registered with the NRF (NOTE 1) (NOTE 6). A change of this attribute shall result in triggering a "NF_PROFILE_CHANGED" notification from NRF towards subscribing NFs located in the same or a different PLMN, but in the latter case the new value shall be notified as a change of the "fqdn" attribute. |
| ipEndPoints | array (IpEndPoint) | O | 1..N | IP address(es) and port information of the Network Function (including IPv4 and/or IPv6 address) where the service is listening for incoming service requests (NOTE 1) (NOTE 7) (NOTE 14). IP addresses provided in ipEndPoints have precedence overprovided IP addresses as part of the NFProfile information and, when using the HTTP scheme, over FQDN provided as part of the NFProfile information (see clause 6.1.6.2.2). |

TABLE 3

Definition of IpEndPoint Attribute of Service Profile

| Attribute name | Data type | P | Cardinality | Description |
|---|---|---|---|---|
| ipv4Address | Ipv4Addr | C | 0..1 | IPv4 address (NOTE 1) |
| ipv6Address | Ipv6Addr | C | 0..1 | IPv6 address (NOTE 1) |
| transport | TransportProtocol | O | 0..1 | Transport protocol |
| port | integer | O | 0..1 | Port number (NOTE 2) Minimum: 0 Maximum: 65535 |

NOTE 1:
At most one occurrence of either ipv4Address or ipv6Address shall be included in this data structure.
NOTE 2:
If the port number is absent from the ipEndPoints attribute, the NF service consumer shall use the default HTTP port number, i.e. TCP port 80 for "http" URIs or TCP port 443 for "https" URIs as specified in IETF RFC 7540 [9] when invoking the service.

Note 1 for the NF profile illustrated in Table 1 and Note 7 for the service profile highlight the following:

NOTE 1: At least one of the addressing parameters (fqdn, ipv4address or ipv6address) shall be included in the NF Profile. If the NF supports the NF services with "https" URI scheme (i.e. use of TLS is mandatory), then the FQDN shall be provided in the NF Profile or the NF Service profile (see clause 6.1.6.2.3). See NOTE 1 of Table 6.1.6.2.3-1 for the use of these parameters. If multiple ipv4 addresses and/or ipv6 addresses are included in the NF Profile, the NF Service Consumer of the discovery service shall select one of these addresses randomly, unless operator defined local policy of IP address selection, in order to avoid overload for a specific ipv4 address and/or ipv6 address.

NOTE 7: If multiple ipv4 addresses and/or ipv6 addresses are included in the NF Service, the NF Service Consumer of the discovery service shall select one of these addresses randomly, unless operator defined local policy of IP address selection, in order to avoid overload for a specific ipv4 address and/or ipv6 address.

The bold portions of the above-described passages indicate that when an NF or service profile supports multiple IP addresses, the consumer shall select one of the addresses randomly unless the operator has defined a specific policy. Relying on the consumer to select among multiple IP addresses in NF or service profile can be problematic, as such a solution is not scalable and may result in different consumer NFs over-selecting the same IP address.

Figure 2:
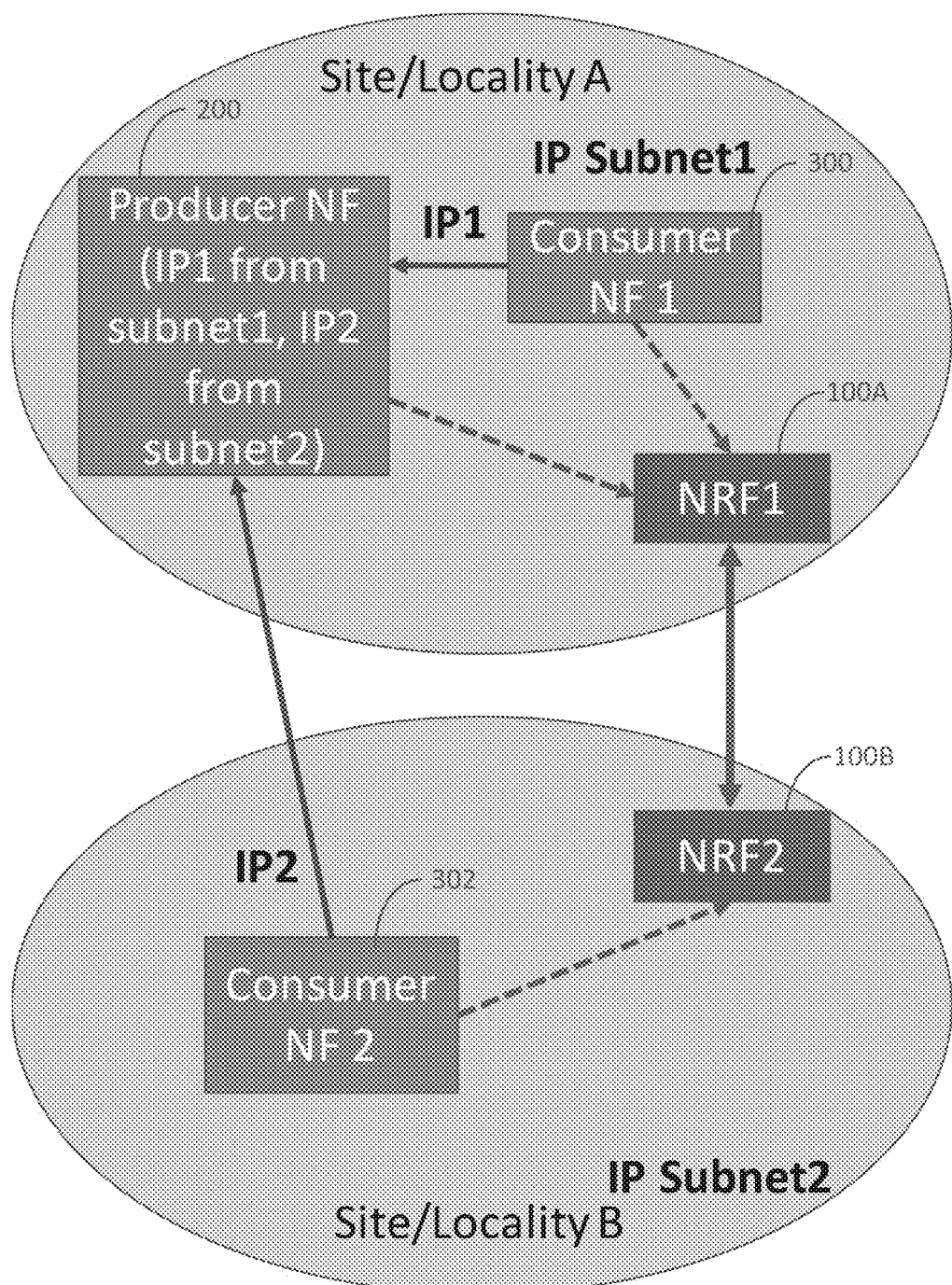
FIG. 2 is a network diagram illustrating a problem that occurs when an NF profile includes multiple IP addresses.

FIG. 2 is a network diagram illustrating a problem that can occur when a producer NF registers multiple IP addresses in its NF or service profile. Referring to FIG. 2, a producer NF 200 located at site/locality A registers IP addresses IP1 and IP2 with NRFs 100A and 100B. The purpose of registering two IP addresses is so that consumer NF1 300 located in site/locality A can contact producer NF 200 using IP address IP1, and consumer NF 302 located in site/locality B can contact producer NF 200 using IP address IP2.

When multiple IP addresses are registered for the same producer NF, consumer NFs need logic to select a routable IP address to reach the producer NF. As illustrated in FIG. 2, it is possible that a producer NF has published multiple IP addresses to make the producer NF reachable from different locations separated by different subnets. For example, producer NF 200 publishes different IP addresses in its NF or service profile to make producer NF 200 reachable from locality A and locality B. In the example in FIG. 2, an NRF instance 100A or 100B exclusive to each locality is shown. However, a network operator may choose to have a shared NRF instance with multiple reachable addresses to make the NRF reachable from different subnets/localities.

When one of consumer NFs 300 and 302 sends an NF discovery request to its local NRF instance 100A or 100B, consumer NF 300 or 302 obtains, via an NF discovery response message, the NF profile of producer NF 200 with both IP addresses. Consumer NF 300 or 302 may run custom logic to find the routable IP address that will be used to set up a connection between the consumer and producer NF, indicated by the arrows between consumer NFs 300 and 302 and producer NF 200. This logic is required by each consumer NF in a different subnet that is trying to connect with producer NF 200.

In some instances, a producer NF may publish multiple IP addresses to load balance network traffic on multiple network interfaces. In this case, 3GPP TS 29.510 suggests that consumer NFs randomly select one of the IP addresses to avoid overload for a specific IPv4 address and/or IPv6 address. Since every consumer NF has its independent selection logic to select an IP address from the NF or service profile of the producer NF, it is possible that all consumer NFs will select the same IP address at the same time, which may result in overloading of the interface associated with the over-selected IP address.

Figure 3:
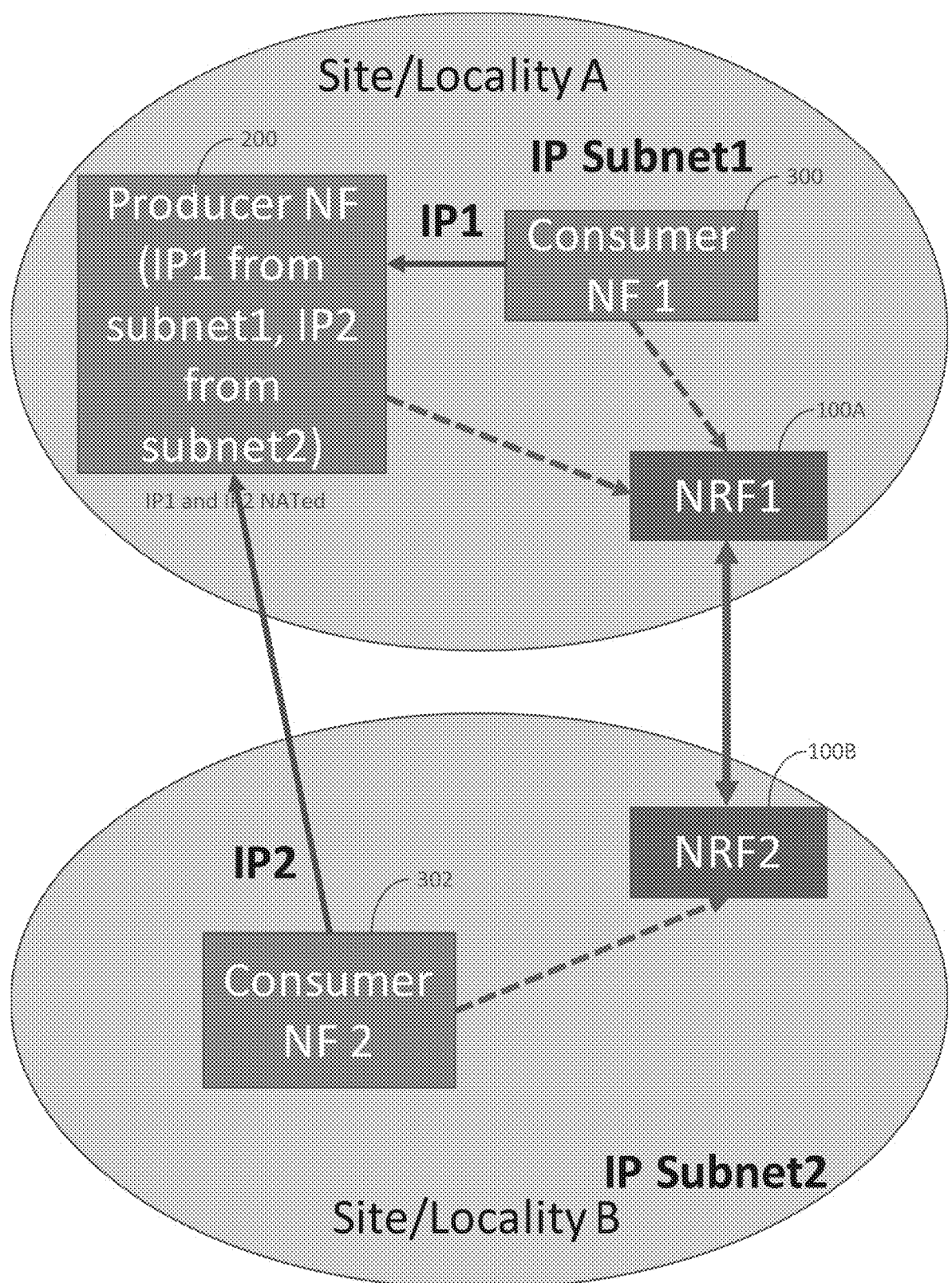
FIG. 3 is a network diagram illustrating a problem that occurs when network address translation is required for IP addresses of a producer NF.

In another example, a producer NF may desire to use network address translation to provide different NATed IP addresses to different networks. FIG. 3 is a network diagram illustrating an instance in which a producer NF provides different network address translated IP addresses to consumer NFs located in different sites or localities. In FIG. 3, producer NF 200 may desire to have consumer NF 300 use NATed IP address IP1 to contact producer NF from locality/site A and NATed IP address IP2 to contact producer NF 200 from locality/site B.

To implement the NATed IP address scheme illustrated in FIG. 3, a network operator may set up routing modules in the operator's network to perform network address translation automatically. In another example, consumer NFs may have custom logic to perform NATing when connecting to a producer NF in a segregated subnet. A producer NF may add a new NATed IP address to the NF profile of the producer NF when a new segregated subnet is hosted by the network operator. Requiring the producer NFs and/or a standalone network address translator to perform NAT for different subnets may result in operational and maintainability challenges within an operator's network.

Figure 4:
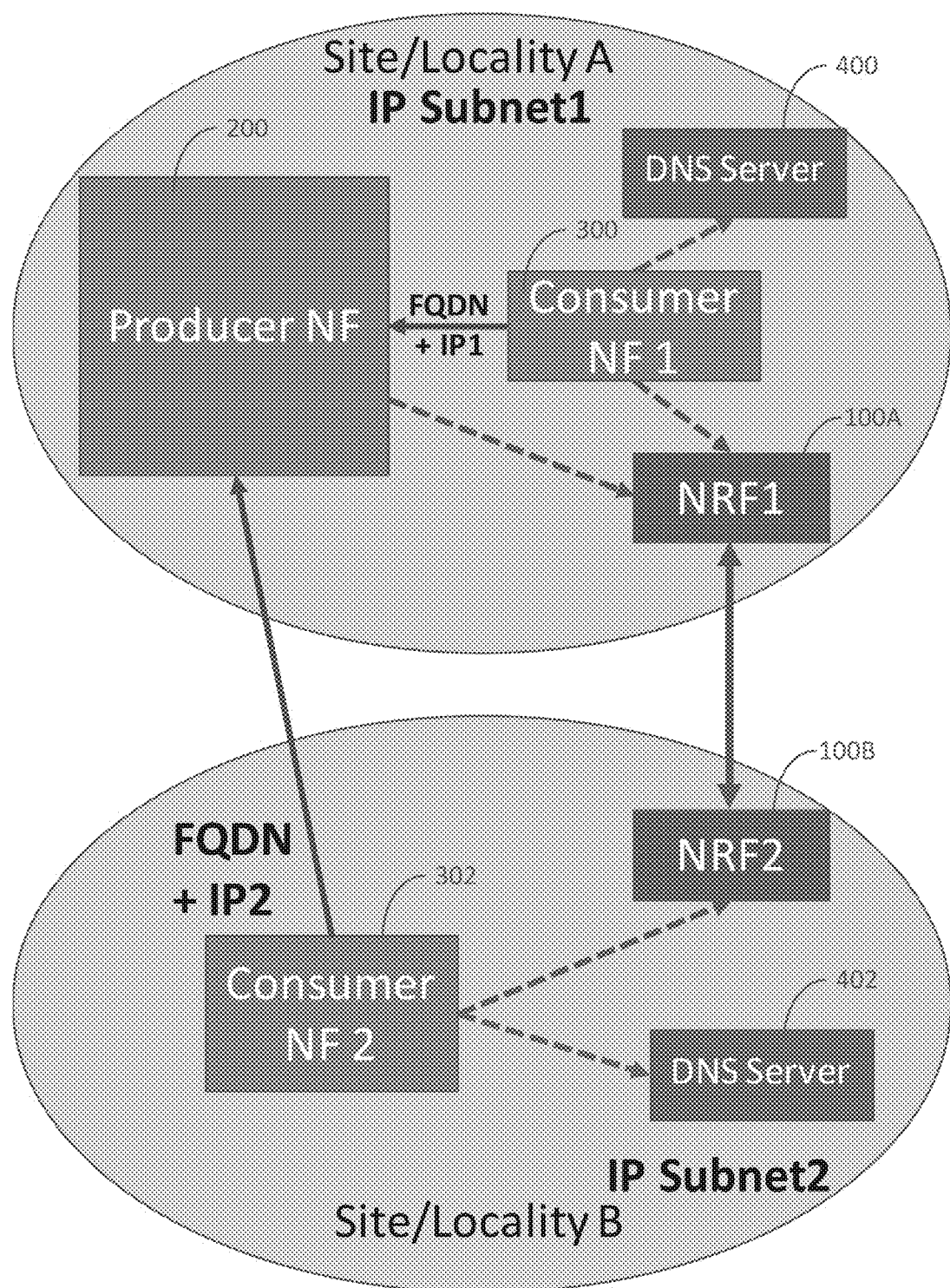
FIG. 4 is a network diagram illustrating problems associated with providing localized DNS support when an NF profile returns an FQDN that requires localized DNS translation.

FIG. 4 is a network diagram illustrating the use of DNS to partially address the issues described with respect to FIGS. 2 and 3. In FIG. 4, DNS servers 400 and 402 are respectively located in sites/localities A and B. DNS server 400 performs DNS lookups for FQDNs requested by consumer NF 300 and returns IP addresses that are routable in site/locality A. Similarly, DNS server 402 performs DNS lookups for consumer NF 302 and returns IP addresses that are routable in site/locality B.

It is assumed that producer NF 200 publishes an FQDN in its NF profile. The functionality for providing locality based DNS is described at the following URL:

https://docs.microsoft.com/en-us/windows-server/networking/dns/deploy/primary-geo-location.

In this model, the operator may set up the DNS such that a common DNS server is provided for every producer NF, which can respond based on the locality of the requestor. In another example, a DNS server may be provided in each locality that has information about all producer NFs in the network and can provide locality-based DNS translation results. In either case, maintaining up to date DNS records is difficult, especially in cloud network environments where NFs are dynamically spawned based on analytical data registered or de-registered at the NRF for a given slice or location.

In light of the issues described above with respect to FIGS. 2-4, there is a need to facilitate managing FQDN to IP address mappings through DNS in 5G networks. There is also a need to enable NATed IP-based routing between segregated networks. Further, there is a need to avoid requiring consumer NF logic to select an IP address for routing when producer NFs publish multiple IP addresses.

To address the aforementioned difficulties, the NRFs described herein may be configured with an IP address mapper and configurable producer NF IP address mapping rules that allow the NRF to intelligently select between/among multiple IP addresses published in an NF or service profile and to select different NATed IP addresses to return to different consumer NFs based on consumer NF attributes, such as locality. The IP address mapper may be used to select among IP addresses in an NF profile to return in response to a DNS query processed by the NRF.

Figure 5:
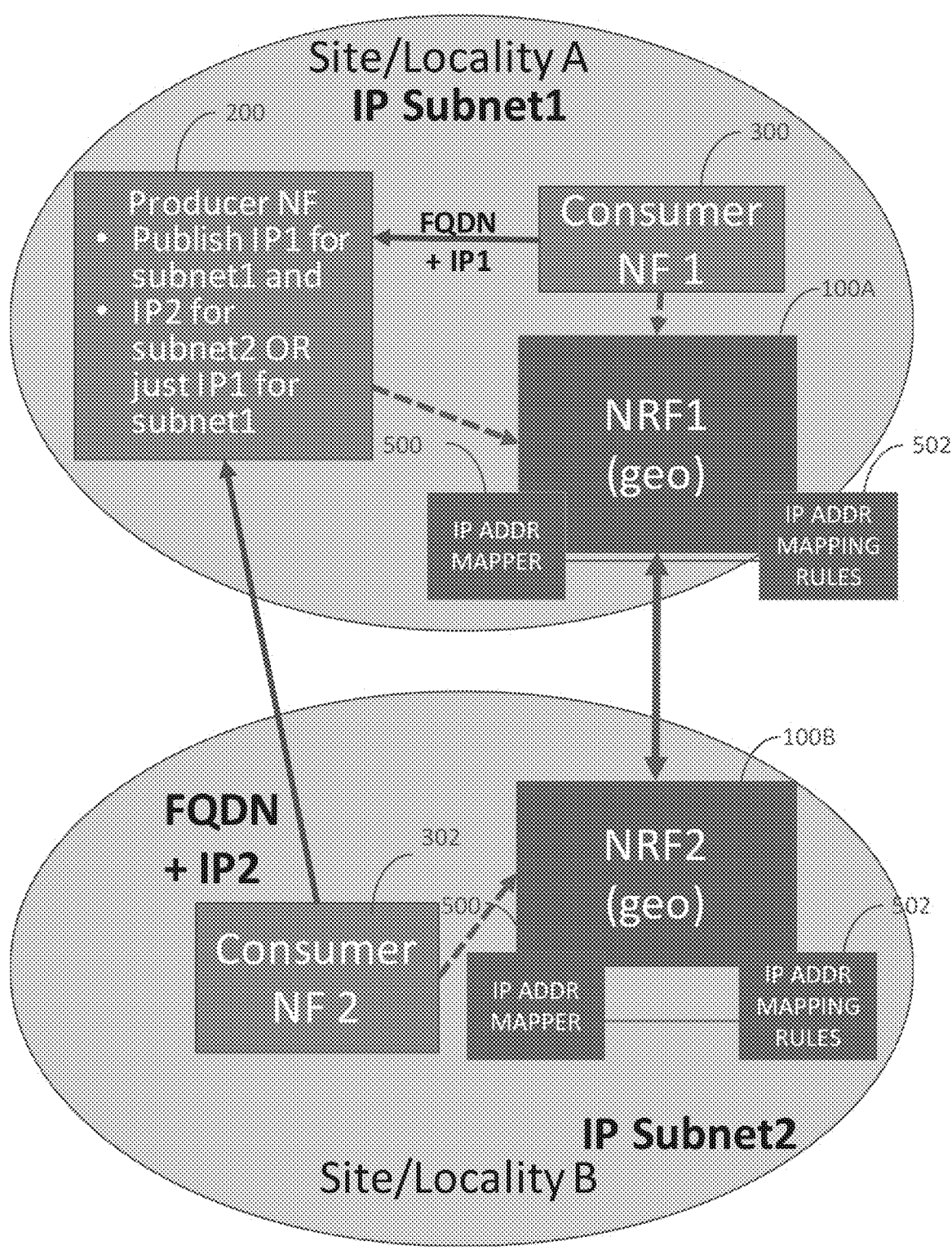
FIG. 5 is a network diagram illustrating an NRF with configurable IP address mapping rules for selecting an IP address to return to the consumer NF when the NF profile contains multiple IP addresses.

FIG. 5 is a network diagram illustrating and NRF with configurable IP address mapping rules and an IP address mapper that uses those rules to select IP addresses to return to consumer NFs and SCPs. Referring to FIG. 5, NRFs 100A and 100B each include IP address mapper 500 and configurable IP address mapping rules 502 to allow selection between or among multiple IP addresses, including NATed IP addresses.

In a first example, a producer NF publishes IP endpoint(s) in its NF or service profile. As described in the preceding paragraph, NRFs 100A and 100B may be configured with operator defined rules, which are referred to herein as producer NF IP address mapping rules, and which enable the NRF to map an IP address in an NF or service profile of a producer NF to information about a consumer NF (such as locality, source IP address, etc.). In response to receiving an NF discovery request, NRF 100A or 100B may locate an NF or service profile that matches the query parameters in the NF discovery request. NRF 100A or 100B may then determine whether any producer NF IP address mapping rules are configured for the NF or service profile. If NRF 100A or 100B determines that producer NF IP address mapping rules are configured for the NF or service profile, NRF 100A or 100B may use the mapping rule and input about the consumer NF to update the IP address returned to the consumer NF or SCP in the NF discovery response with a specific IP address to be used to contact the producer NF. The producer NF IP address mapping rules can be based on an operator network deployment model. For example, if the network operator implements network segregation, and the producer NF publishes only a single IP address based on the subnet of the producer NF, the NRF may generate and provide an NATed IP address to each consumer NF in the NF discovery response, where different NATed IP addresses may be provided to consumer NFs in different localities, and the NATed IP address provided to each consumer NF is a routable IP address from the locality or site of the consumer NF.

To determine the NATed IP address to use for a particular consumer NF, the NRF may utilize information about the consumer NF. For example, if the consumer NF provides a requester-nf-instance-id in the NF discovery request, the NRF may use the requester-nf-instance-id to locate the NF or service profile of the consumer NF and use one or more of the following attributes: NF instance ID, FQDN, IP endpoint information, locality, network slice, etc., from the consumer NF profile to select a producer NF IP address mapping rule usable to determine an IP address of the producer NF to return to the consumer NF in the NF discovery response, In another example, the NRF may use the source IP subnet of the TCP datagram that carries the NF discovery request or other source-identifying parameter(s) from the NF discovery request to select the producer NF IP address mapping rule used to generate or select the IP address to return to the consumer NF in the NF or service profile.

If the network operator implements network segregation, and a producer NF publishes multiple IP addresses for different subnets, then the NRF may use any of IP endpoint information, locality, slice, etc. from the NF profile of the consumer NF to locate a matching producer NF IP address mapping rule and select one of the IP addresses to return to the consumer NF. Otherwise, the NRF may utilize the source IP subnet of the TCP datagram that carries the NF discovery request or other source identifying parameter(s) from the NF discovery request. If a producer NF publishes multiple IP addresses for load balancing, a producer NF IP address mapping rule may be used to select one or more IP addresses that are routable from the site or locality of the consumer NF, and a load balancing algorithm may be used if there are multiple of such addresses after application of the rule.

Figure 6:
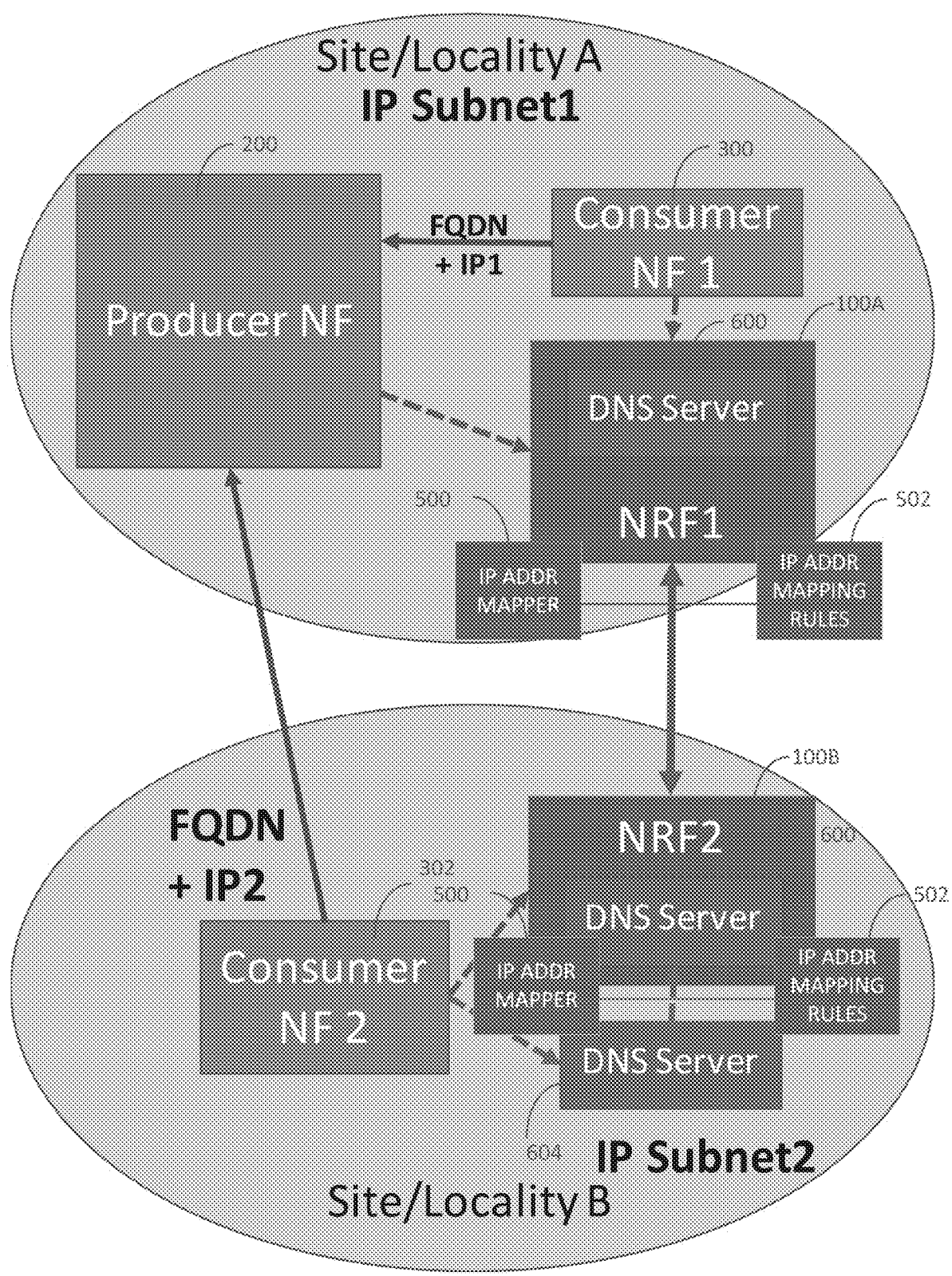
FIG. 6 is a network diagram illustrating an NRF with an integrated DNS server that provides localized DNS support and selection among multiple IP addresses, including NATed IP addresses.

FIG. 6 is a network diagram illustrating an exemplary solution for producer NF IP address mapping at the NRF when a producer NF publishes an FQDN and one or more IP endpoints in its NF or service profile. In the example in FIG. 6, producer NF 200 publishes an FQDN and IP endpoint addresses IP1 and IP2 in its NF or service profile, which is registered with NRFs 100A and 100B. In addition, each NRF 100A and 100B includes a DNS server 600 that receives DNS queries or resolution requests from consumer NFs and that returns a routable IP address in response to the DNS queries. NRFs 100A and 100B may include producer NF IP address mappers 500 and producer NF IP address mapping rules 502 as described above to select among multiple IP addresses to provide in a DNS response message.

As indicated above, producer NF 200 publishes an FQDN and IP endpoint(s) in its NF or service profile. Producer NF 200 may choose to publish one or multiple IP addresses, based on the network operator's deployment model. Cohosting DNS servers 600 with NRFs 100A and 100B allows NRFs 100A and 100B to manage DNS entries based on registrations, deregistrations, and updates of the NF profile. If the network includes a local DNS server, such as DNS server 604, local DNS server 604 may be configured to forward DNS queries to a DNS server 600 co-hosted with the NRF 100A or 100B that is closest to the DNS server that received the DNS query.

Producer NF IP address mappers 500 may use producer NF IP address mapping rules 502 to select IP addresses to be returned by DNS servers 600. For example, if a network operator implements network segregation, DNS server 600 may return an IP address selected by IP address mapper 500 based on the source IP address of the TCP datagram that carries the DNS query. The IP address returned to the consumer NF in the DNS response can either be one of the IP addresses published by the producer NF in the NF or service profile or a NATed IP address selected by IP address mapper 500 associated with DNS server 600 based on operator configuration and information available in the producer NF's profile. If producer NF 200 publishes multiple IP addresses for the same subnet, and NRF 100A or 100B determines that all of the IP addresses published by producer NF 200 are applicable to consumer NF 300 or 302, then NRF 100A or 100B selects one of the IP addresses (based on operator policy) and returns the IP address as part of DNS query response.

Accordingly, based on operator network/deployment and configuration, the NRF as described herein selects among multiple IP addresses in an NF profile for load balancing or other criteria in a manner that provides a routable IP address to a consumer NF. The NRF as described herein also selects and returns NATed IP addresses to consumer NFs that are routable from the networks of the consumer NFs. The NRF further performs DNS lookups and returns routable IP addresses to consumer NFs while maintaining updated DNS records based on NF registration, deregistration and update service operations. In one example, a local DNS server separate from the NRF can forward DNS queries to the NRF so that the NRF can perform DNS resolution.

Figure 7:
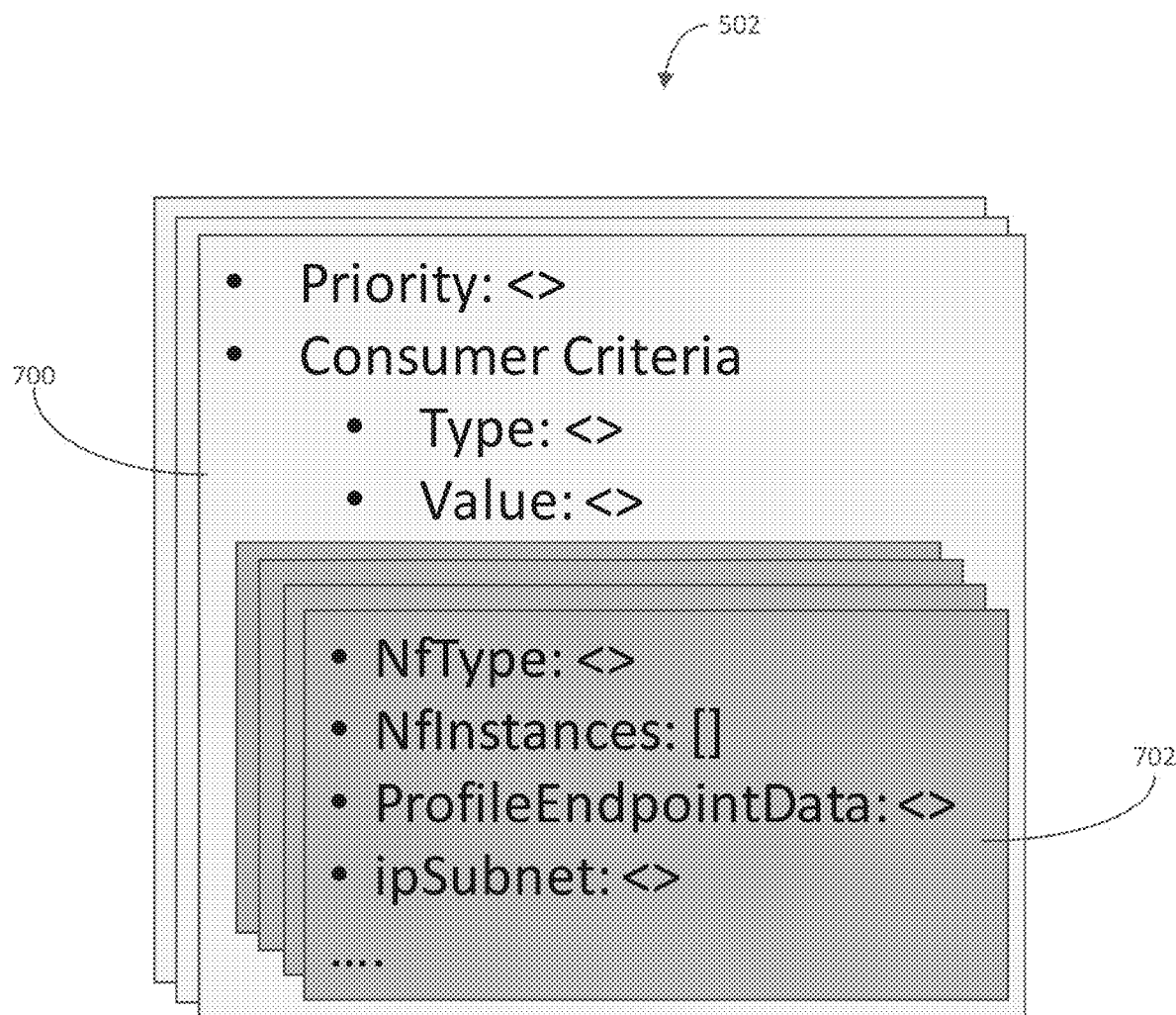
FIG. 7 is a block diagram illustrating exemplary producer NF IP address mapping rules that maybe be configured at the NRF.

The NRF may include producer NF IP address mapping rules that are used to determine the IP address that is returned to a consumer NF or SCP in an NF or service profile. FIG. 7 illustrates exemplary producer NF IP address mapping rules. Referring to FIG. 7, producer NF IP address mapping rules 502 are divided into ConsumerCriteria 700 and ProducerConfigList 702. ConsumerCriteria 700 includes criteria from or relating to a consumer NF that can be used to select a rule from ProducerConfigList 702. In the example, ConsumerCriteria 700 includes a priority attribute, which has a value ranging between 0 and 255 with lower numeric priority values indicating higher priorities. ConsumerCriteria further includes a Type attribute, which has a value that can be any of [instance id, fqdn, IP endpoint, Locality, IP subnet]. If a consumer NF provides a requester-nf-instance-id in discovery request, then instance id, fqdn, IP endpoint, locality, etc., can be fetched from the consumer NF profile registered with the NRF. The Value field in the ConsumerCriteria stores the value of the attribute specified by the Type attribute. If "IP subnet" is set, the rule for the producer NF will be applied for a consumer NF with matching a "IP subnet" in any IP endpoint published by the consumer NF in its profile. The IP subnet shall be set when enabling DNS support at the NRF.

The Value specified in the consumer Criteria is compared to criteria in the ProducerConfigList to locate one or more matching rules. If multiple rules in a given ConsumerCriteria matches incoming request parameters or with the IP address in the TCP datagram, then the rule with the highest priority (i.e., closer to 0) wins and is used to select the ProducerConfigList object to evaluate the IP address that is returned to the consumer NF or SCP. ConsumerCriteria can match to multiple rows, i.e., for some ProducerConfigLists, ConsumerCriteria is set based on locality. For some ProducerConfigLists, ConsumerCriteria may be set to IPSet. Priority acts as a tie breaker when an incoming request from a consumer NF matches multiple ConsumerCriteria. Based on priority, a given rule is selected which will have a list of ProducerConfigLists. Within the ProducerConfigList, NfType and NfInstance act as keys for selection of a mapping rule. Thus, priority is not required to select a mapping rule within a ProducerConfigList.

The ProducerConfigList is a list of configuration rules for producers having multiple IP addresses published in their NF or service profiles or producers for which NATed IP address shall be generated. These rules can be used to provide IP information in the NF profile or as part of DNS resolution. If a producer NF does not match with the NfType and NfInstance, then its profile will be provided as is (i.e., without modification) in a response to an NF discovery request. NfType is the type of producer NF to which the rule applies. If a producer NF profile matches NfType and NfInstance, then the NRF will used the matching rule from the ProducerConfigList to determine the IP address to return to the consumer NF or SCP in the NF discovery response. The ProducerConfigList can have multiple records for the same NfType, which allows unique configurations for different producer instances.

NfInstances is an optional parameter that is used to specify a list of NfInstances on which a given rule will be applied. If missing, the rule will be considered as a default for a given NfType and will be applied to all NfInstances that are not explicitly specified. When specified, entries of NfInstance must be unique within various entries in the ProducerConfigList. For a given NfType, one configuration with an empty NfInstance list shall be allowed within the ProducerConfigList.

The ProfileEndpointData attribute is used to specify of the following values: [FQDN, IP, BOTH]. When the ProfileEndpointData is set to FQDN, only FQDN information will be provided in the NF profile returned to the consumer NF or SCP, even when an FQDN and one or more IP addresses are present in the NF profile. The value FQDN shall be set only if the operator has external DNS or the NRF can perform the DNS lookup. When the ProfileEndpointData attribute is set to IP, only IP information will be provided in the NF profile returned to the consumer NF or SCP, even when an FQDN and one or more IP addresses are present in the NF profile. When the ProfileEndpointData attribute is set to BOTH, FQDN information and relevant IP address(es) will be provided in the NF profile returned to the consumer NF or SCP when an FQDN and one or more IP addresses are present in the NF profile.

The ipSubnet attribute in the ProducerConfigList is used to specify the IP subnet address that matches a given subnet from the producer NF profile. If a consumer NF sends an NF discovery request, based on ConsumerCriteria, a ProducerConfigList is selected. From the matching NfType and NfInstance, a matching producer configuration is found. Based on the IPset, an IP address is selected from a producer NF profile and returned as part of the NF discovery response. If the request being processed by the NRF is a DNS resolution request instead of an NF discovery request, ConsumerCriteria will be matched with the IP address in the TCP datagram that carries the DNS resolution request. Based on the requested FQDN (in the DNS resolution request), a matching NF instance ID is found from the DNS mapping table (see Table 4). Then, based on NfType and instanceId, a corresponding ProducerConfig rule will be applied, i.e., based on the IPSet configuration in the ProducerConfig rule, the NRF will return the corresponding IP address from the producer NF profile, as a DNS query response. If none of the IP addresses in the NF profile match with a given subnet, then all IP addresses (provided by the producer NF) will be returned in the NF profile included in the NF discovery response message.

The NATset attribute is used to specify List[<producerPublishedIP,NatedIP>]. List of NATed IP set. If a producer NF or service profile contains an IP address specified in the list as producerPublishedIP, then that IP address will be replaced with a corresponding NATed IP address in the NF or service profile (for discovery response) or in a DNS response. NATed IP address(es) will be selected and returned in the NF profile or DNS response, if the NATed IP address matches the value of the ipSubnet parameter.

The loadBalancingIP attribute is only applicable when ProfileEndpointData is set to IP or Both. There can be multiple IP addresses in a producer NF profile that match a given ipSubnet. The loadBalancingIP parameter allows the NRF to decide if all or one IP address will be returned in the NF profile. When ProfileEndpointData is set to FQDN or "DNS support" is enabled at the NRF, the loadBalancingIP parameter is set to TRUE by default. When the loadBalancingIP attribute is set to TRUE, alternate IP addresses (determined by processing the IP addresses in the NF profile using ipSubnet and NATset) will be returned with every discovery request. Otherwise, all relevant IP addresses will be returned.

Figure 8:
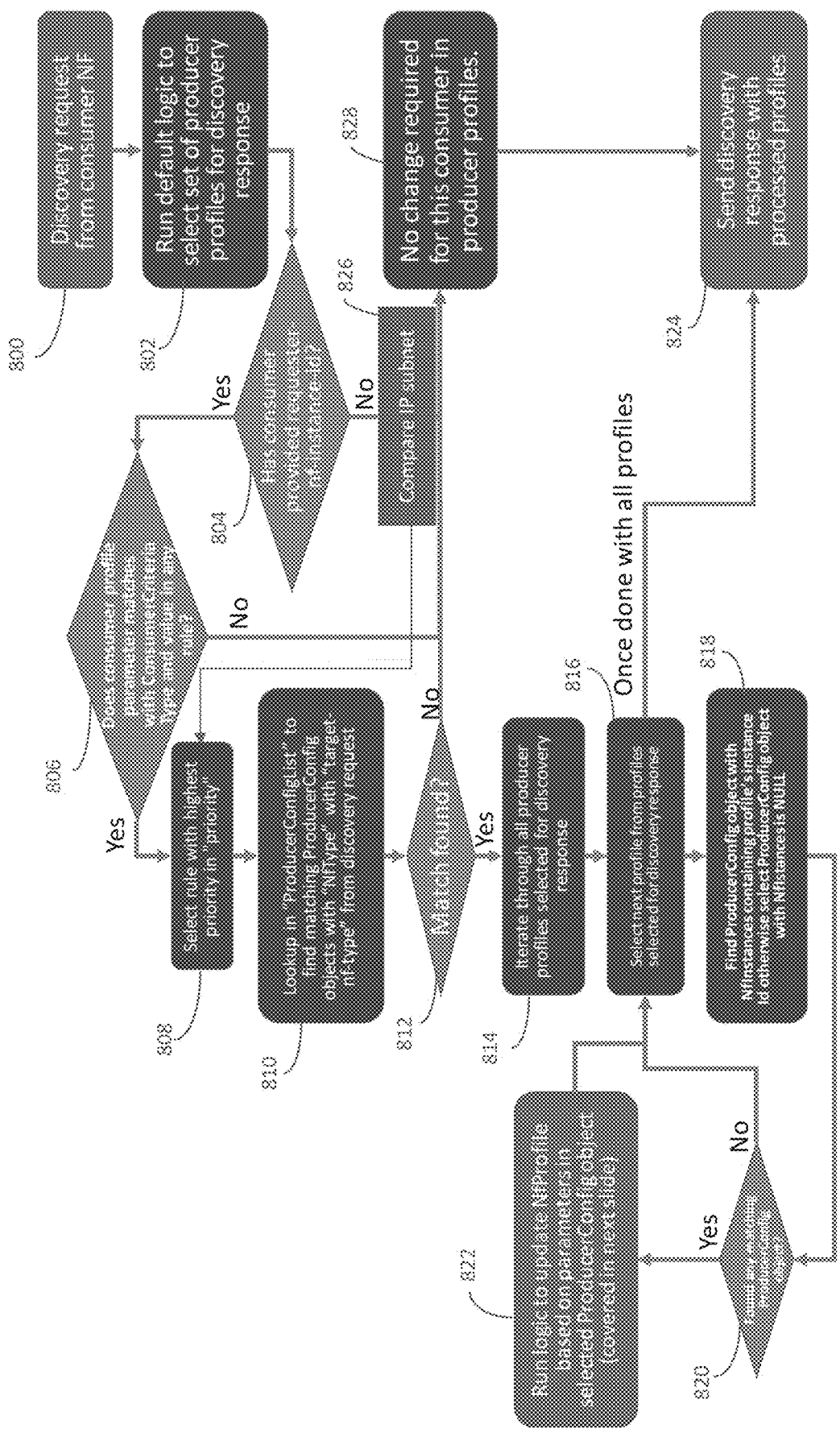
FIG. 8 is a flow chart illustrating an exemplary process that may be implemented by the NRF in processing an NF discovery request using producer NF IP address mapping rules.

FIG. 8 is a flow chart illustrating an exemplary process performed by an NRF in processing an NF discovery request. Referring to FIG. 8, in step 800, the NRF receives an NF discovery request from a consumer NF. In the case of delegated discovery, the NF discovery request may come from an SCP that is performing discovery on behalf of a consumer NF. In step 802, the NRF runs default logic to select a set of producer NF profiles to include in the discovery response. Step 802 may include comparing query parameters in the NF discovery request with corresponding attributes in NF profiles registered with the NRF to locate matching NF profiles.

In step 804, the NRF determines whether the consumer NF provided a requester-nf-instance-id in the NF discovery request. If the consumer NF provided a requester-nf-instance-id, control proceeds to step 806 where the NRF looks up the consumer NF profile corresponding to the requester-nf-instance-id. The NRF then extracts parameters from the consumer NF profile and compares the parameters to the value of the Type attribute specified in the ConsumerCriteria of producer NF IP address mapping rules 502. If the parameters from the consumer NF profile match the value of the Type attribute of the ConsumerCriteria of any of the producer NF IP address mapping rules, control proceeds to step 808 where the NRF selects the rule with the highest priority in the priority attribute of the rule. Control then proceeds to step 810 where the NRF performs a lookup in the ProducerConfigList to find matching ProducerConfig objects with NF type and target NF type attributes that match the corresponding attributes from the discovery request. In step 812, it is determined whether a match is found for the comparison in step 810. If a match is found, control proceeds to step 814 where the NRF begins the process of iterating through all producer NF profiles selected for the discovery response to perform steps to update the IP addresses.

Iterating through the NF profiles begins with step 816 where the NRF selects the next profile from the profiles selected for the discovery response. In step 818, the NRF finds the ProducerConfig object with NF instances containing the profile's instance ID or otherwise selects the ProducerConfig objects with NF instances set to null. Control then proceeds to step 820 where the NRF determines whether any profiles with matching producer configuration objects are found. If matching objects are found, control proceeds to step 820 where the NRF runs logic to update the NF profile based on parameters selected in the ProducerConfig object. In step 820, if there are no matching parameters or after the parameters are updated in step 822, control returns to step 816 where the next profile is selected. Steps 816 through 822 are repeated until all of the profiles have been processed. Controlled then proceeds to step 824 where the modified NF profiles are returned to the consumer NF in an NF discovery response.

Returning to step 804, if the consumer NF did not provide a requester-nf-instance-id, control proceeds to step 826 where the IP subnet of the TCP datagram that carries the NF discovery request is compared with the IP subnet attribute of the ConsumerCriteria with type as "IP subnet". Control then proceeds to step 808 where The highest priority matching rule is selected. Steps 810 through 824 are then performed to process the NF profiles that will be returned in the NF discovery response.

Returning to step 812, if there is not a match in the ProducerConfigList to the NF type or target NF type from the discovery request, control proceeds to step 828 where it is determined that no change is required to the producer NF profiles. Control then returns to step 824 where the unprocessed NF profiles are returned in the NF discovery response.

Figure 9:
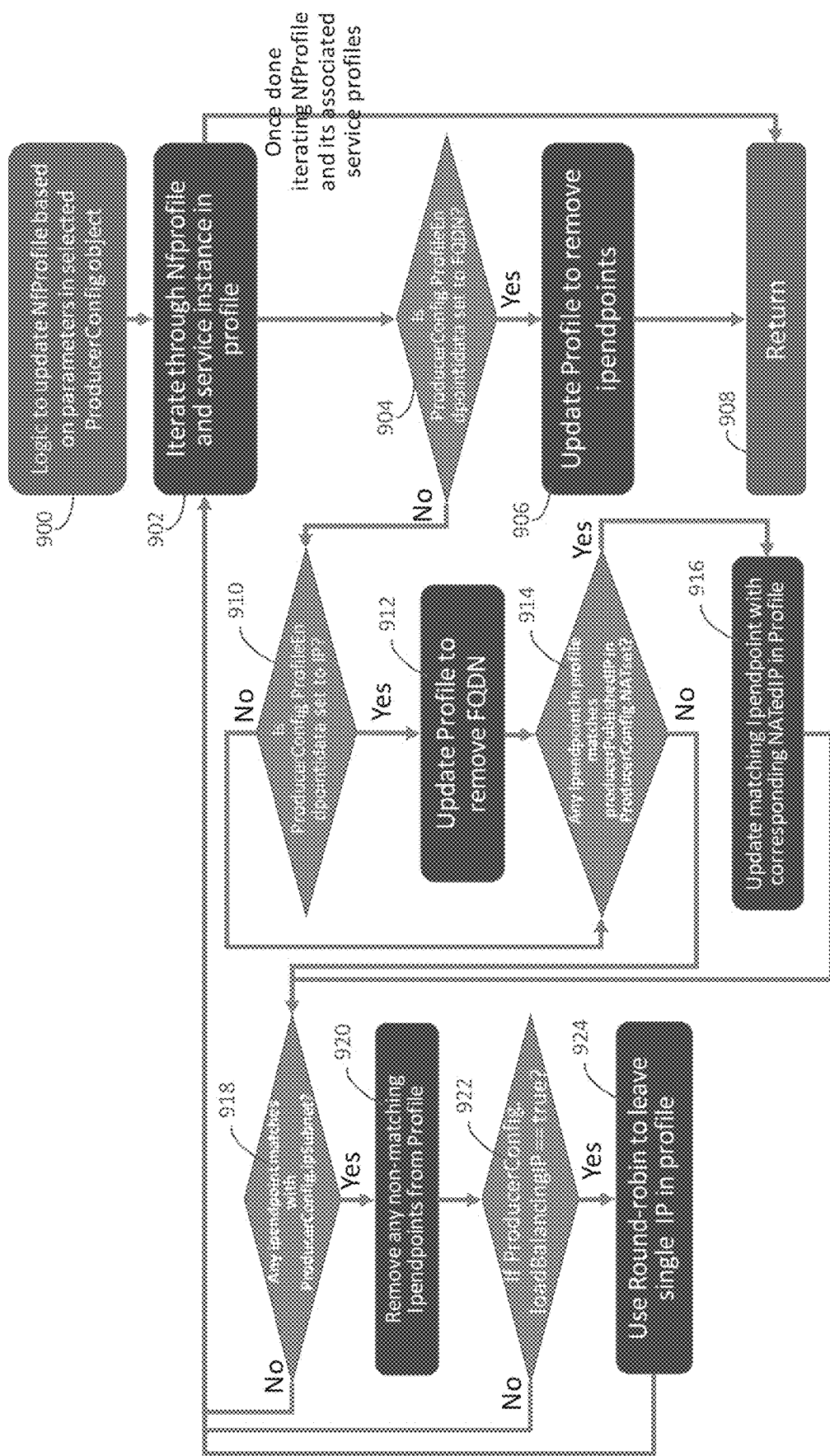
FIG. 9 is a flow chart illustrating an exemplary process that may be performed by an NRF to update NF (and its associated service) profile parameters in an NF discovery response using producer NF IP address mapping rules.

FIG. 9 is a flow chart illustrating exemplary steps performed by the NRF to update NF (and its associated service) profile parameters as specified in step 822 in FIG. 8. Referring to FIG. 9, in step 900, logic to update the NF and its services profile based on parameters in the selected ProducerConfig object begins. In step 902, the NRF iterates through the NF profile and service instances in the profile to update the parameters. The first step in the iteration is step 904 where the NRF determines whether the ProducerConfig.ProfileEndpointData attribute is set to FQDN. If the ProducerConfig.ProfileEndpointData attribute is set to FQDN, control proceeds to step 906 where the NRF removes the ipEndPoints from the NF profile. Control then proceeds to step 908 and then to step 902 where processing of the next NF profile begins.

Returning to step 904, if the NRF determines that the ProducerConfig.ProfileEndpointData attribute is not set to FQDN, control proceeds to step 910 where it is determined whether the ProfileConfig.ProfileEndpointData attribute is set to IP. If the ProfileConfig.ProfileEndpointData attribute is set to IP, control proceeds to step 912 where the NRF updates the profile to remove the FQDN. Control then proceeds to step 914 where the NRF determines whether any of the ipEndPoints specified in the NF profile match any of the IP addresses in the producerPublishedIP attribute in the ProducerConfig.NATset. If any of the ipEndPoints in the profile match any of the IP addresses specified in the producerPublishedIP attribute in ProducerConfig.NATset, control proceeds to step 916 where the matching IpEndPoint is replaced with the NATed IP address specified in ProducerConfig.NATset. Control then proceeds to step 918 where it is determined whether any IpEndPoint matches with ProducerConfig.IPsubnet. If the answer in step 918 is yes, control proceeds to step 920 where the NRF removes non-matching ipEndPoints from the NF profile. Control then proceeds to step 922 where the NRF determines whether ProducerConfig.LoadBalancingIP is set to TRUE. if ProducerConfig.LoadBalancingIP is set to TRUE, control proceeds to step 924 where the NRF uses round robin selection or other load balancing algorithm to select a single IP address to remain in the NF profile that will be returned or sent to the consumer NF. Control then returns to step 902 where the iteration through the remaining NF profile or service profiles (within the NfProfile) to be returned in the NF discovery response continues. Steps 904 through 918 are repeated for each NF profile to be included in the NF discovery response.

Returning to step 910, if ProducerConfig.ProfileEndpointData is not set to IP (or FQDN), control proceeds to step 914 where it is determined whether any IpEndPoint in the profile matches the producer published IP address in ProducerConfig.NATset. Steps 914 to 924 are then used to update the IP address to include in the NF or service profile returned to the consumer NF.

Returning to step 914, If none of the ipEndPoints in the NF profile match producerPublishedIP in ProducerConfig.NATset, control returns to steps 918 through 924 where the IP addresses in the ipEndPoints attribute of the NF or service profile are processed without replacing any of the IP addresses with a NATed IP address.

Figure 10:
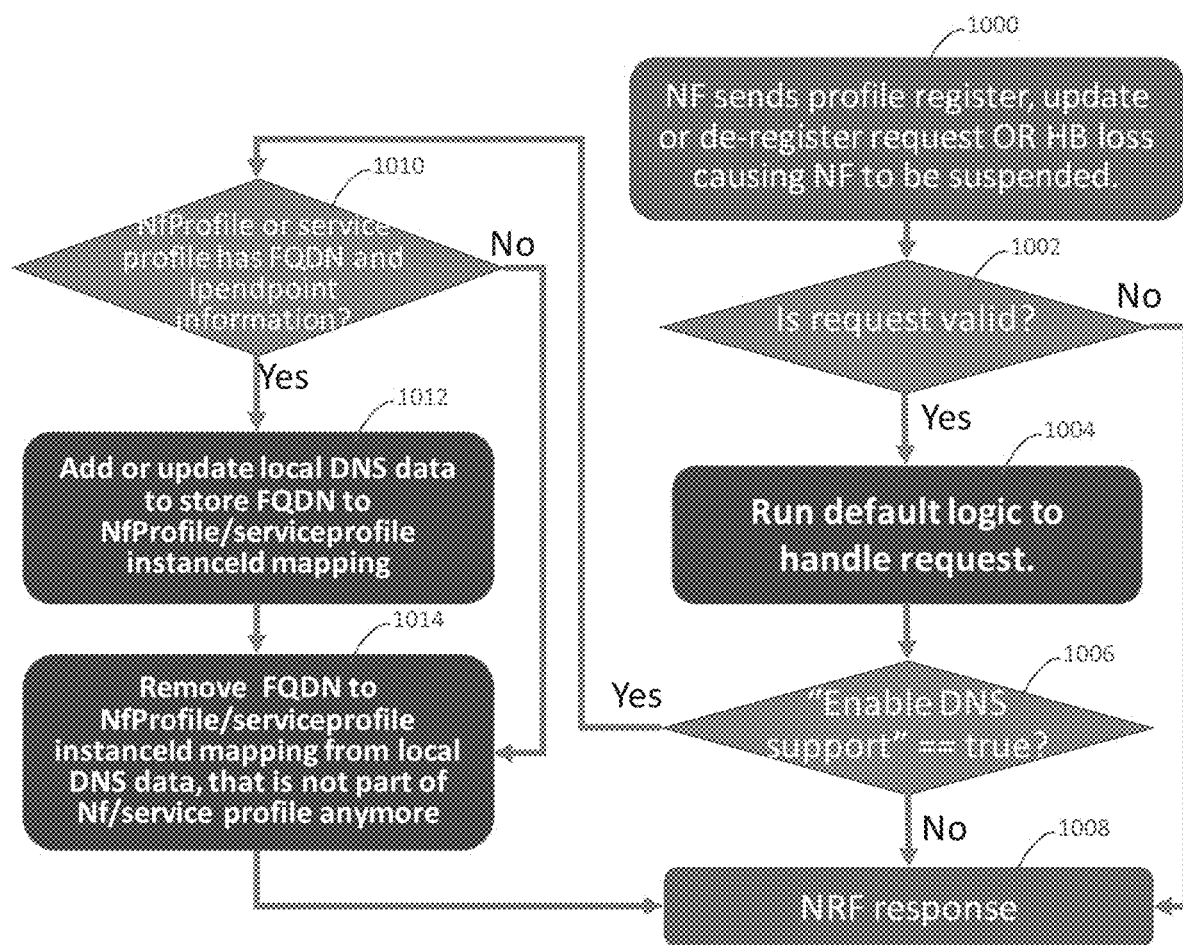
FIG. 10 is a flow chart illustrating an exemplary process that may be performed by an NRF enabled to provide localized DNS support.

FIG. 10 is a flow chart illustrating an exemplary process performed by the NRF in generating local DNS data usable to obtain responses to DNS requests in response to NF register, NF update, and NF deregister service operations. Referring to FIG. 10, in step 1000, an NF sends an NF profile register, update, or deregister service request to the NRF. Step 1000 may also include the NRF failing to receive a response to an NF heart-beat request within the NF heart-beat interval defined for the producer NF instance.

In step 1002 it is determined whether the NF register, update, or deregister request is valid. If the request is not valid, control proceeds to step 1004 where the NRF responds to the request without generating any local DNS data.

If the request in step 1002 is determined to be valid, control proceeds to step 1004 where the NRF runs its default logic to handle the request. Step 1004 may include generating an Nnrf management response to the request. In step 1006, the NRF determines whether DNS support is enabled. If DNS support is not enabled, control proceeds to step 1008 where the NRF generates a response to the request message without generating any local DNS data.

If DNS support is enabled, control proceeds to step 1010 where the NRF determines if the NF or service profile has FQDN and IpEndPoint information. If the NF profile has FQDN and IpEndPoint information, control proceeds to step 1012 where the NRF adds or updates local DNS data to store the FQDN to NF profile/service profile instance ID mapping. Step 1012 also applies to case when the NF resumes heart-beating. The NRF adds all FQDNs (in the NF profile or service profile of resumed instance) to the DNS data store. Control then proceeds to step 1014 were the NRF removes the FQDN to NF profile/service profile instance ID mapping from local DNS data that is not part of the NF service/profile anymore. Step 1014 also applies to the case of NF heart-beat loss, causing the NF profile to be marked as SUSPENDED. The NRF removes all FQDNs (in the NF profile or service profile of the SUSPENDED NF instance) from the DNS data store.

Returning to step 1010, if the NF or service profile does not have FQDN and IpEndPoint information, control proceeds to step 1014 were the NRF removes the FQDN to NF profile/service profile instance ID mapping from local DNS data that is not part of the NF service/profile anymore. After step 1014, control returns to step 1004 where the NRF responds to the request for the Nnrf service operation Table 4 illustrates an example of local DNS data that may be maintained by the NRF.

TABLE 4

Local DNS Data

| FQDN | NF ProfileID | Source FQDN | InstanceID |
|---|---|---|---|
| Abc.com | Profile-instance-id1 | Nf | Profile-Instance-id1 |
| Xyz.com | Profile-instance-id2 | Service | Service-InstanceID |

As will be described in detail below, the local DNS data in Table 4 obtained from NF register requests, NF deregister requests, and NF update requests can be used to locate NF profiles which are used to provide IP addresses in response to DNS queries.

Figure 11:
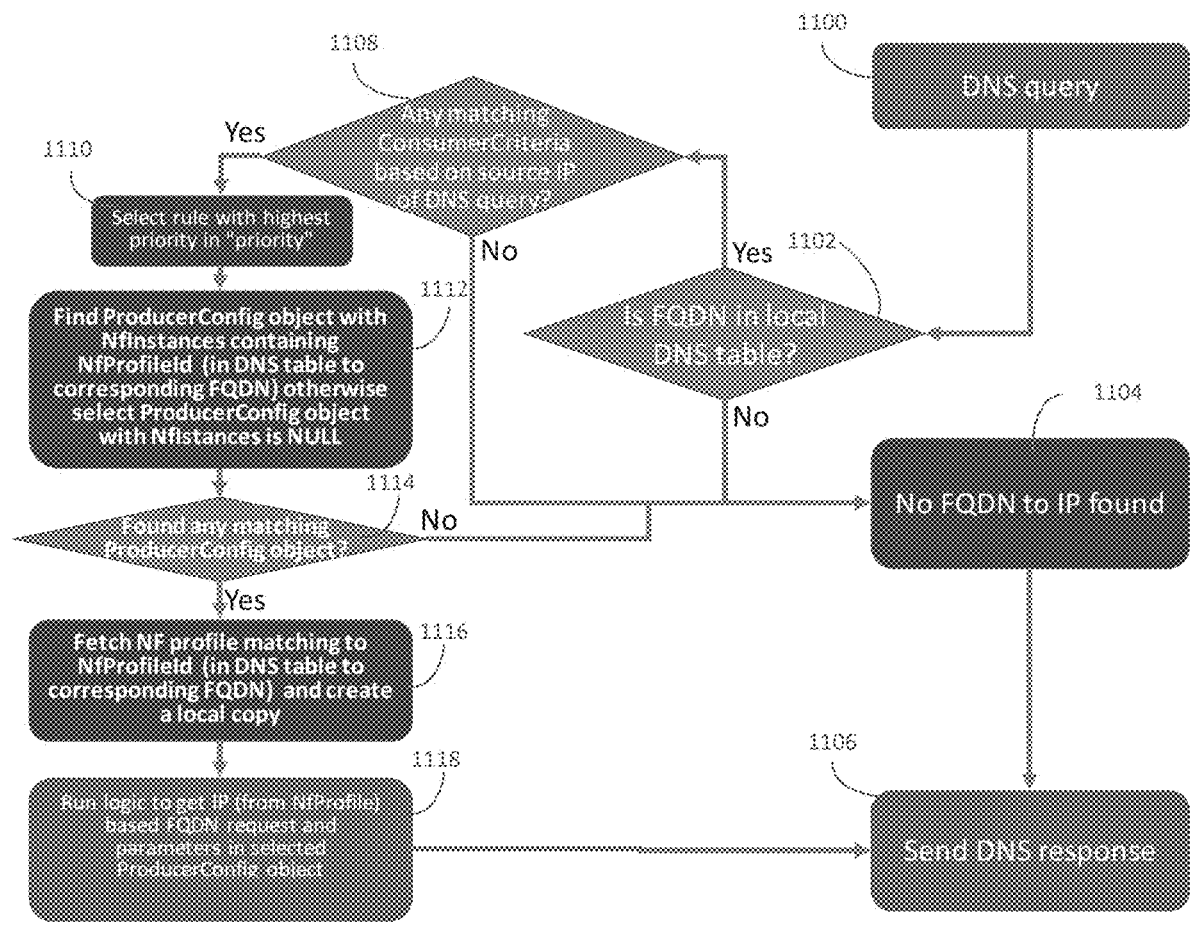
FIG. 11 is a flow chart illustrating an exemplary process that may be performed by an NRF in processing a DNS query using producer NF IP address mapping rules.

FIG. 11 is a flow chart illustrating exemplary steps that may be performed by the NRF in processing a DNS query using IP addresses obtained from NF or service profiles. Referring to FIG. 11, in step 1100, the NRF receives a DNS query. In step 1102, the NRF determines whether the FQDN in the DNS query is in the local DNS table (see Table 4). If the FQDN is not in the local DNS table, control proceeds to step 1104 where the NRF determines that no FQDN to IP address mapping is found and then to step 1106 where the NRF returns a DNS response indicating that no IP address mapping is found.

In step 1102, if the FQDN in the DNS query is found in the local DNS table, control proceeds to step 1108 where the NRF determines whether any matching ConsumerCriteria are present based on the DNS query. If there are no matching ConsumerCriteria present, control proceeds to step 1104 and 1106 where the NRF determines that no FQDN to IP address mapping is found, and a DNS response without an IP address is sent to the requester.

In step 1108, if matching ConsumerCriteria based on the source IP address of the DNS query is found, control proceeds to step 1110 where the producer NF IP address mapping rule of the highest priority and with the matching ConsumerCriteria is selected. Control then proceeds to step 1112 where the NRF finds the ProducerConfig object with NF instances containing the NF profile ID (corresponding to the FQDN in the local DNS table). Otherwise, the NRF selects the ProducerConfig object with the NF instance attribute set to null.

In step 1114, the NRF determines whether any matching ProducerConfig objects are located. If no matching ProducerConfig objects are located, control returns to step 1104 and 1106 where no FQDN to IP address mapping is determined to be found, and the DNS response is sent.

In step 1116, if a matching ProducerConfig object is found, control proceeds to step 1118 where the NRF fetches the NF profile matching the NF profile ID in the DNS table corresponding to the FQDN and creates a local copy. Control then proceeds to step 1120 where the NRF runs logic to obtain IP addresses from the NF profile based on the FQDN from the DNS request and parameters in the selected ProducerConfig object.

Figure 12:
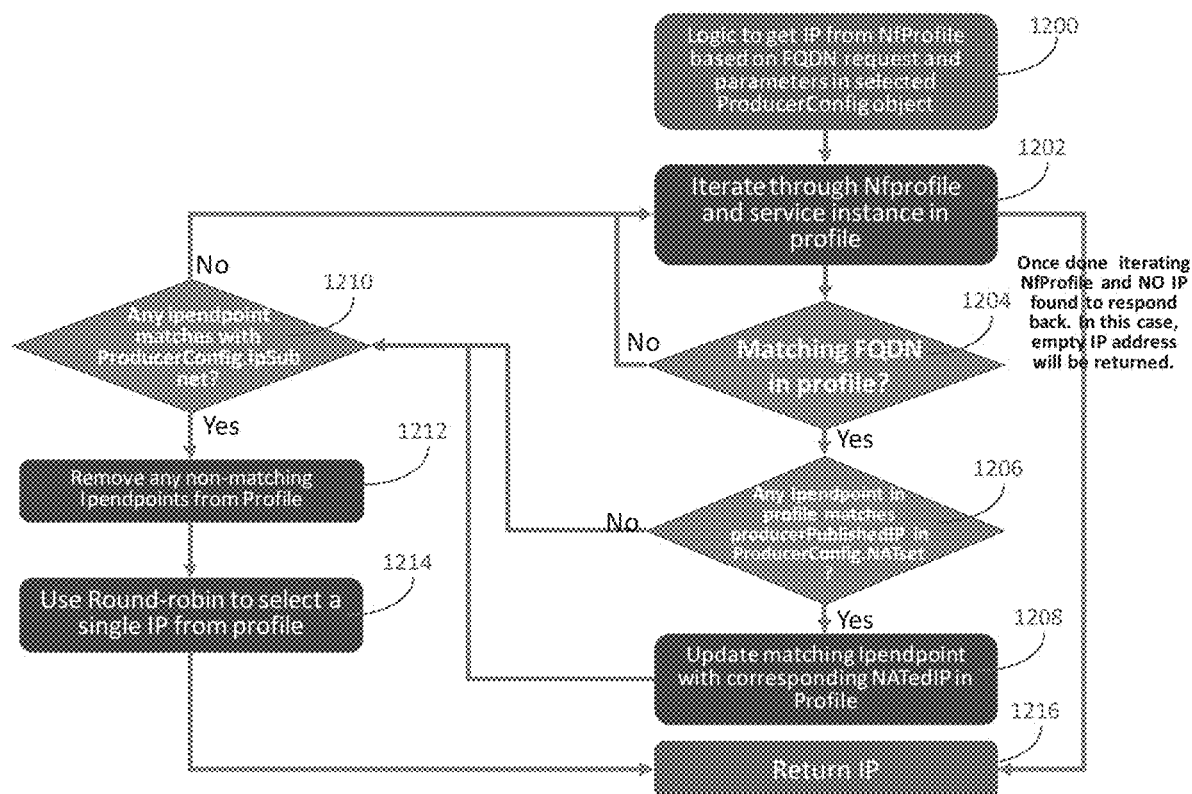
FIG. 12 is a flow chart illustrating an exemplary process that may be performed by an NRF in selecting, using a producer NF IP address mapping rule, an IP address to include in an NF profile to be sent in an NF discovery response.

FIG. 12 Is a flow chart illustrating an exemplary process performed by the NRF to find an IP address from an NF profile to return in a DNS response. Referring to FIG. 12, in step 1200, the logic to obtain the IP address from the NF or service profile based on the DNS request and parameters in the selected ProducerConfig object is initiated. In step 1202, the NRF begins the process of iterating through the NF profile and the service instance in the NF profile to select an IP address. In step 1204, the NRF determines whether there is a matching FQDN in the profile. If there is a matching FQDN in the profile, control proceeds to step 1206 where the NRF determines whether any IP endpoints in the NF profile match the producerPublishedIP in ProducerConfig-.NATset. If there are any matching IP addresses, control proceeds to step 1208 where the NRF updates the matching IP addresses in the ipEndPoints with the corresponding NATed IP address in the NF profile. After step 1208 or if there are no matching ipEndPoints in step 1206, control proceeds to step 1210 where the NRF determines whether there are any IpEndPoint matches with ProducerConfig.IPsubnet. If there are any IpEndPoint matches, control proceeds to step 1212 where the NRF removes any nonmatching IP endpoints from the profile. Control then proceeds to step 1214 where the NRF uses round robin selection or other selection algorithm to select a single IP address from the profile. Control then proceeds to step 1216 where the NRF returns the IP address from the NF or service profile to be included in the DNS response.

Figure 13:
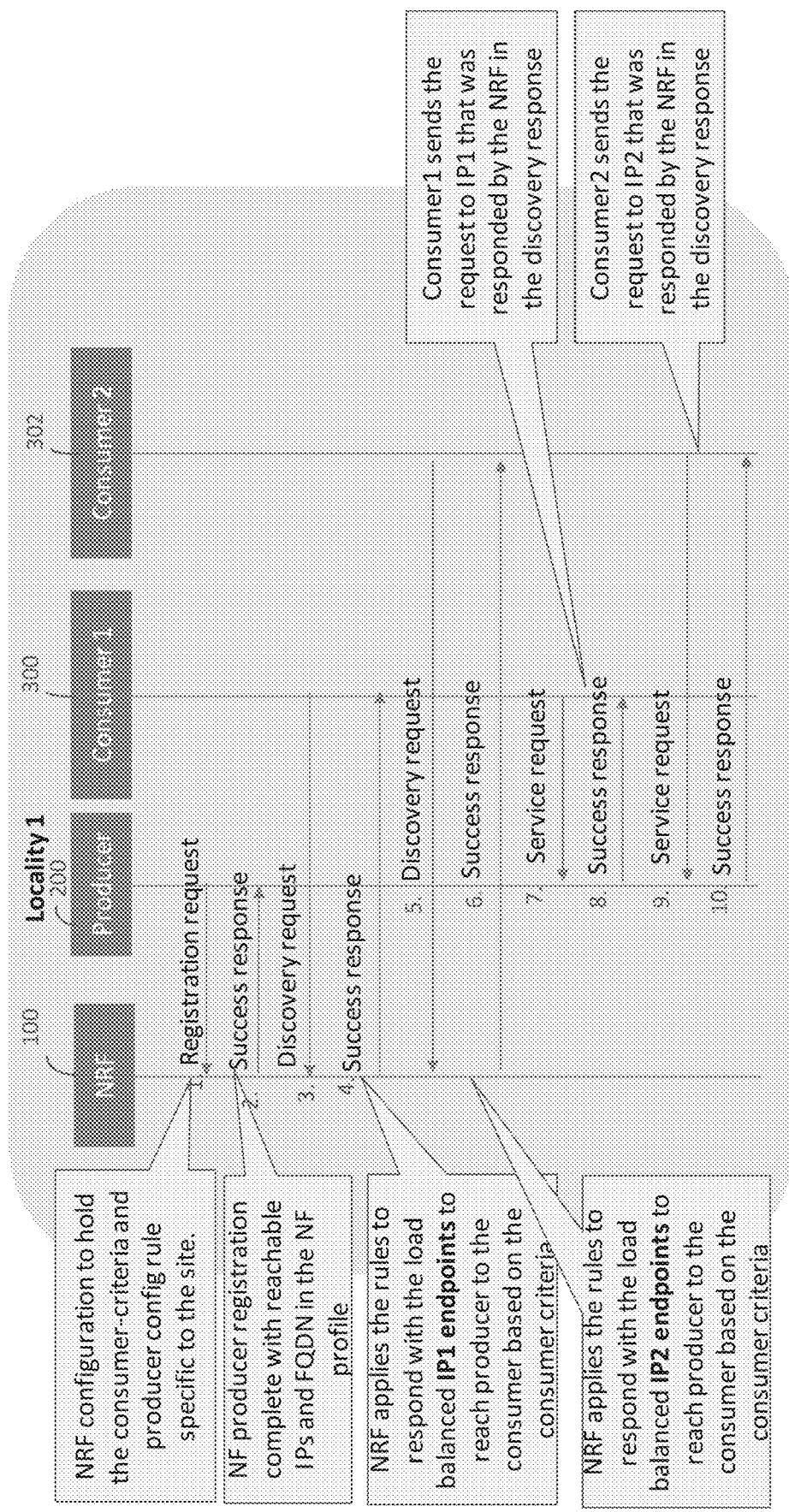
FIG. 13 is a message flow diagram illustrating exemplary messages exchanged when an NRF provides support for selecting one of multiple IP addresses for load balancing.

FIG. 13 is a message flow diagram illustrating exemplary messages exchanged for using configurable producer NF IP address mapping rules at the NRF to select a routable IP address among multiple IP addresses in an NF profile using load balancing. Referring to FIG. 13, in line 1, producer NF 200 sends an NF register request to NRF 100. The NF register request includes multiple IP addresses and an FQDN in the NF profile. NRF 100 is also configured with configurable IP address mapping rules to select a routable IP address specific to the site of a consumer NF. In line 2 of the message flow diagram, NRF 100 responds to producer NF 200 with a success response indicating successful registration of the NF profile.

In line 3, consumer NF 300 sends an NF discovery request to NRF 100. NRF 100 locates NF profiles that match the query parameters in the NF discovery request and uses the producer NF IP address mapping rules to select IP address IP1 from the ipEndPoints in the NF profile of producer NF 200. NRF 100 modifies the NF profile to include the IP address IP1 and, in line 4, sends and NF discovery response with the modified NF profile to consumer NF 300.

In line 5 of the message flow diagram, consumer NF 302 sends an NF discovery request to NRF 100. NRF 100 selects NF profiles corresponding to the query parameters in the NF discovery request and applies the producer NF IP address mapping rules to select IP address IP2 from the ipEndPoints attribute of the NF profile to return to consumer NF 302. In line 6, NRF 100 sends the NF discovery response with the modified NF profile to consumer NF 302.

In line 7, consumer NF 300 sends an SBI service request to producer NF 200 using the routable IP address IP1. In line 8, producer NF 200 responds with a success response. In line 9, consumer NF 302 sends a service request to producer NF 200 using the IP address IP2. In line 10, producer NF 200 responds with a success response.

Figure 14:
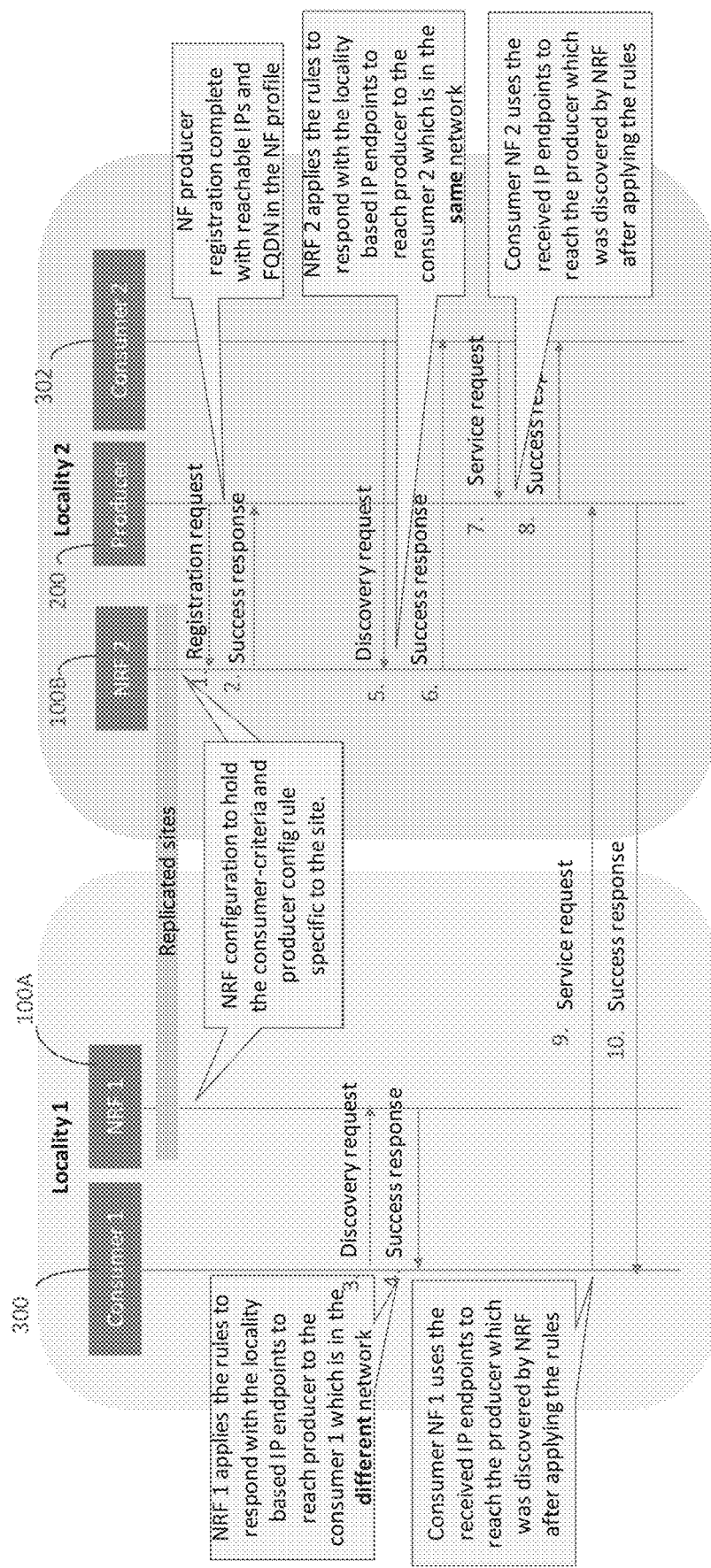
FIG. 14 is a message flow diagram illustrating exemplary messages exchanged when an NRF provides support for selecting among multiple IP addresses for consumers in different localities using producer NF IP address mapping rules.

FIG. 14 is a message flow diagram illustrating exemplary messages exchanged in using configurable IP address mapping rules at the NRF to provide different IP addresses to consumer NFs located in different networks. In FIG. 14, it is assumed that NRFs 100A and 100B are each configured with producer NF IP address mapping rules to select among IP addresses in an NF profile to return to consumer NFs in different networks. In line 1, producer NF 200 sends an NF register request to NRF 100B. The NF register request includes multiple IP addresses and an FQDN in the NF profile. In line 2 of the message flow diagram, NRF 100B responds to producer NF 200 with a success response indicating successful registration of the NF profile. NRF 100B replicates the NF profile to geo-redundant mate NRF 100A.

In line 3, consumer NF 300 sends an NF discovery request to NRF 100A. NRF 100A locates NF profiles that match the query parameters in the NF discovery request and uses the producer NF IP address mapping rules to select a routable IP address from the ipEndPoints in the NF profile of producer NF 200 based on the locality or other source-identifying parameter. NRF 100A modifies the NF profile to include the selected IP address, and, in line 4, sends and NF discovery response with the modified NF profile to consumer NF 300.

In line 5 of the message flow diagram, consumer NF 302 sends an NF discovery request to NRF 100B. NRF 100B selects NF profiles corresponding to the query parameters in the NF discovery request and applies the producer NF IP address mapping rules to select a routable IP address from the ipEndPoints attribute of the NF discovery request of the NF profile to return to consumer NF 302. In line 6, NRF 100B sends the NF discovery response with the modified NF profile to consumer NF 302.

In line 7, consumer NF 302 sends an SBI service request to producer NF 200 using the routable IP address that consumer NF 302 received from NRF 100B. In line 8, producer NF 200 responds with a success response. In line 9, consumer NF 300 sends a service request to producer NF 200 using the IP address IP2. In line 10, producer NF 200 responds with a success response.

Figure 15:
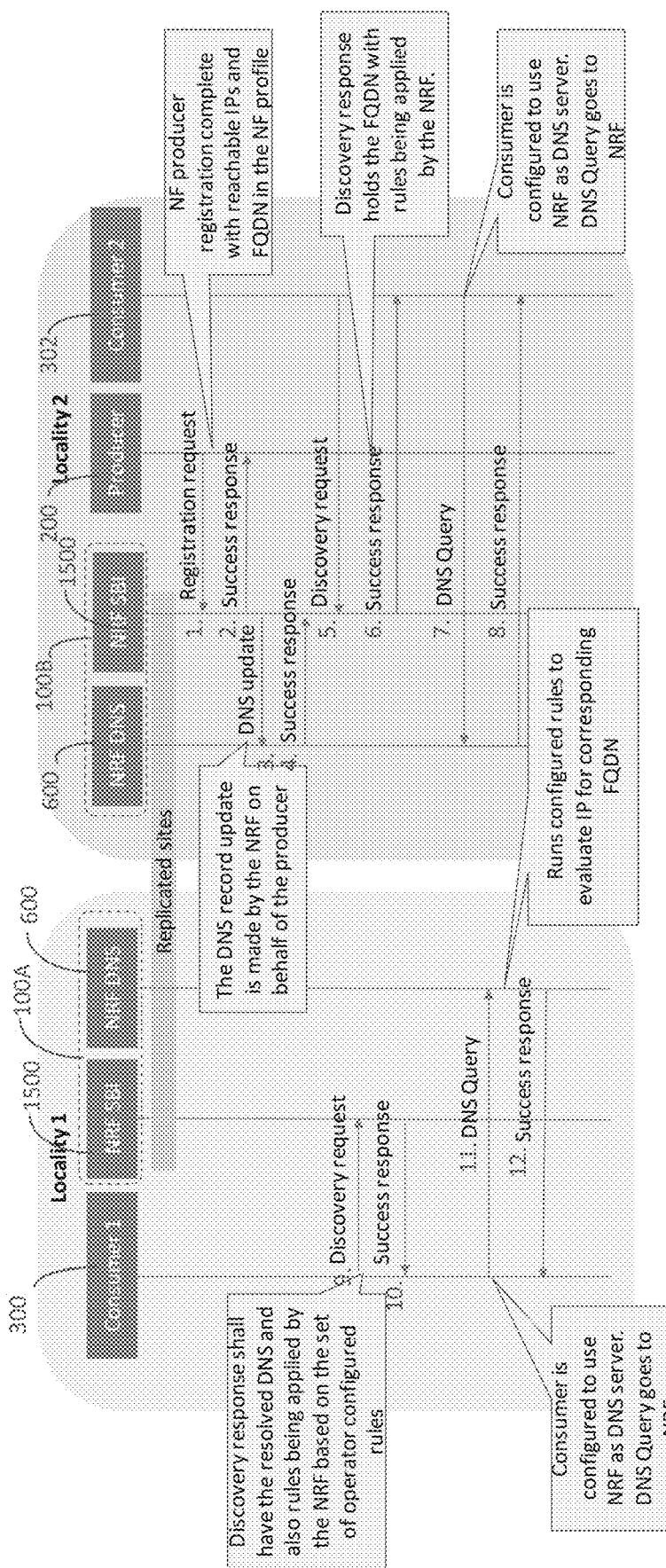
FIG. 15 is a message flow diagram illustrating exemplary messages exchanged when an NRF provides localized DNS support for the NF discovery service.

FIG. 15 is a message flow diagram illustrating exemplary messages exchanged when an NRF provides support for local DNS for NF discovery service. In FIG. 15 NRF 100A and 100B each include an NRF SBI interface 1500 for receiving and responding to SBI service requests and an NRF DNS server 600 for receiving and responding to DNS requests. In line 1 of the message flow diagram, producer NF 200 sends an NF register request to SBI interface 1500 of NRF 100B. In line 2, NRF SBI interface 1500 of NRF 100B responds with a success response. In this example, it is assumed that the NF profile registered by producer NF 200 includes multiple reachable IP addresses and an FQDN. In line 3 of the message flow diagram, NRF SBI interface 1500 updates DNS records with the IP addresses and FQDN received in the NF register request in line 1. It is understood that the DNS resource record may be updated directly or local DNS mapping data may be updated as described above with regard to Table 4.

In line 4 of the message flow diagram, NRF DNS server 600 responds to NRF SBI interface 1500 with a success response confirming successful updating of the DNS data. NRF 100B replicates the NF profile registered in line 1 to georedundant mate NRF 100A. NRF 100A stores the NF profile in its NF profiles database and updates its DNS data.

In line 5 of the message flow diagram, consumer NF 302 sends an NF discovery request to SBI interface 1500 of NRF 100B. In line 6 of the message flow diagram, NRF 100B responds with a success response including the NF profile of producer NF 200. The NF profile may include the FQDN of producer NF 200 in accordance with rules being applied by NRF 100B. In line 7 of the message flow diagram, consumer NF 302 sends a DNS query to NRF DNS server 600. In line 8, NRF DNS server 600 of NRF 100B responds with a routable IP address to consumer NF 302 using the DNS mapping data received in the registration request in line 1.

In line 9 of the message flow diagram, consumer NF 300 sends an NF discovery request to NRF SBI interface 1500 of NRF 100A. In line 10, NRF SBI interface 1500 of NRF 100A responds with a success response including the NF profile of producer NF 200. In line 11, consumer NF 300 sends a DNS query to NRF DNS server 600 of NRF 100A. In line 12, NRF DNS server 600 of NRF 100A responds with a routable IP address to consumer NF 300.

Figure 16:
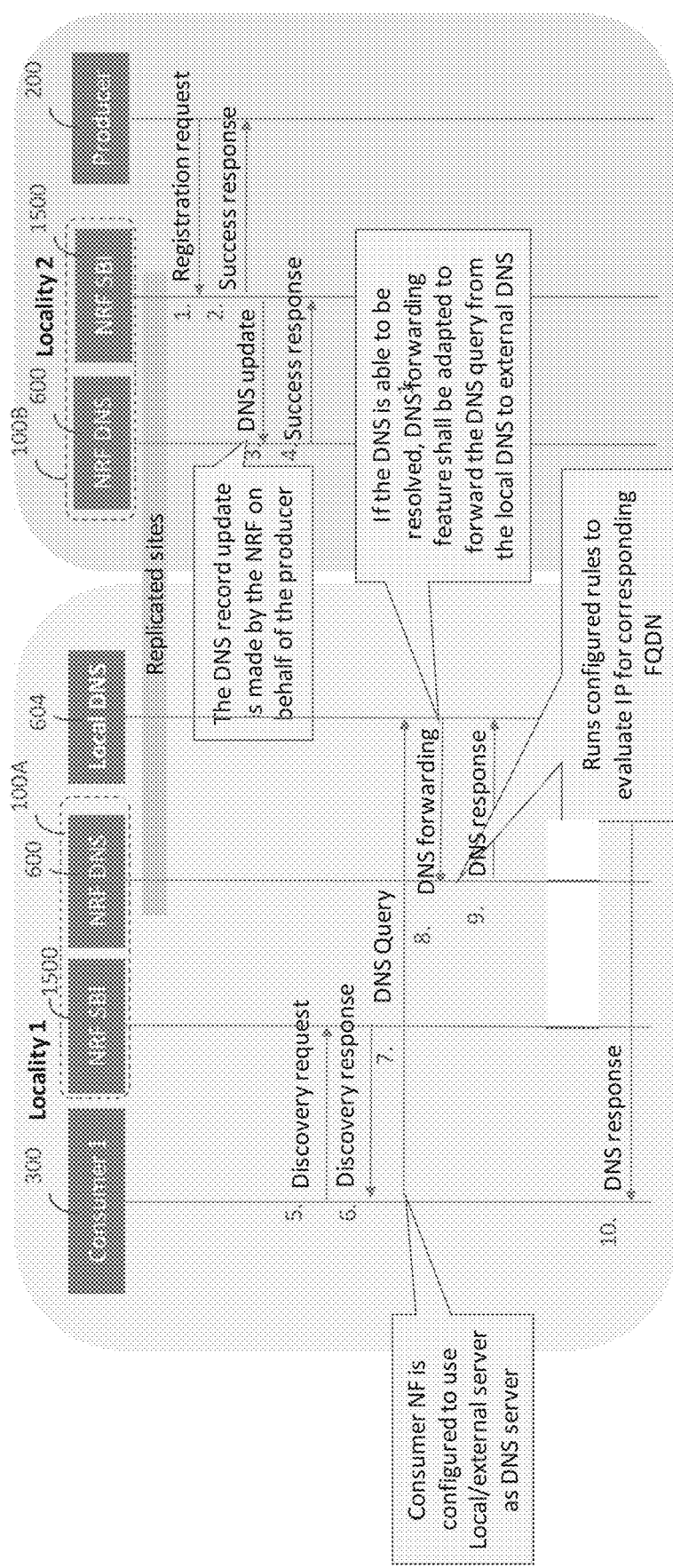
FIG. 16 is a message flow diagram illustrating exemplary messages exchanged when an NRF provides localized DNS support, including support for DNS forwarding to the nearest NRF for DNS resolution.

FIG. 16 is a message flow diagram illustrating exemplary messages exchanged when a DNS server supports forwarding a DNS query to a local DNS server for DNS resolution. Referring to FIG. 16, in line 1 of the message flow diagram, producer NF 200 sends an NF register request to SBI interface 1500 of NRF 100B. In line 2, NRF SBI interface 1500 of NRF 100B responds with a success response. In this example, it is assumed that the NF profile registered by producer NF 200 includes multiple reachable IP addresses and an FQDN. In line 3 of the message flow diagram, NRF SBI interface 1500 updates DNS records with the IP addresses and FQDN received in the NF register request in line 1. It is understood that the DNS resource record may be updated directly or local DNS mapping data may be updated as described above with regard to Table 4.

In line 4 of the message flow diagram, NRF DNS server 600 responds to NRF SBI interface 1500 with a success response confirming successful updating of the DNS data. NRF 100B replicates the NF profile registered in line 1 to geo-redundant mate NRF 100A. NRF 100A stores the NF profile in its NF profiles database and updates its DNS data.

In line 5 of the message flow diagram, consumer NF 300 sends an NF discovery request to SBI interface 1500 of NRF 100B. In line 6 of the message flow diagram, NRF 100A responds with a success response including the NF profile of producer NF 200. The NF profile may include the FQDN of producer NF 200 in accordance with rules being applied by NRF 100A. In line 7 of the message flow diagram, consumer NF 300 sends a DNS query to local DNS server 1600, which is external to NRF 100A. In line 8, local DNS server 1600 implements DNS forwarding by sending a corresponding DNS query to NRF DNS server 600 of NRF 100A. In line 9, NRF DNS server 600 of NRF 100A responds with a routable IP address to local DNS server 1600 using the DNS mapping data received in the registration request in line 1.

In line 10, local DNS server 1600 sends a DNS response to consumer NF 300 with the routable IP address of producer NF 200.

Figure 17:
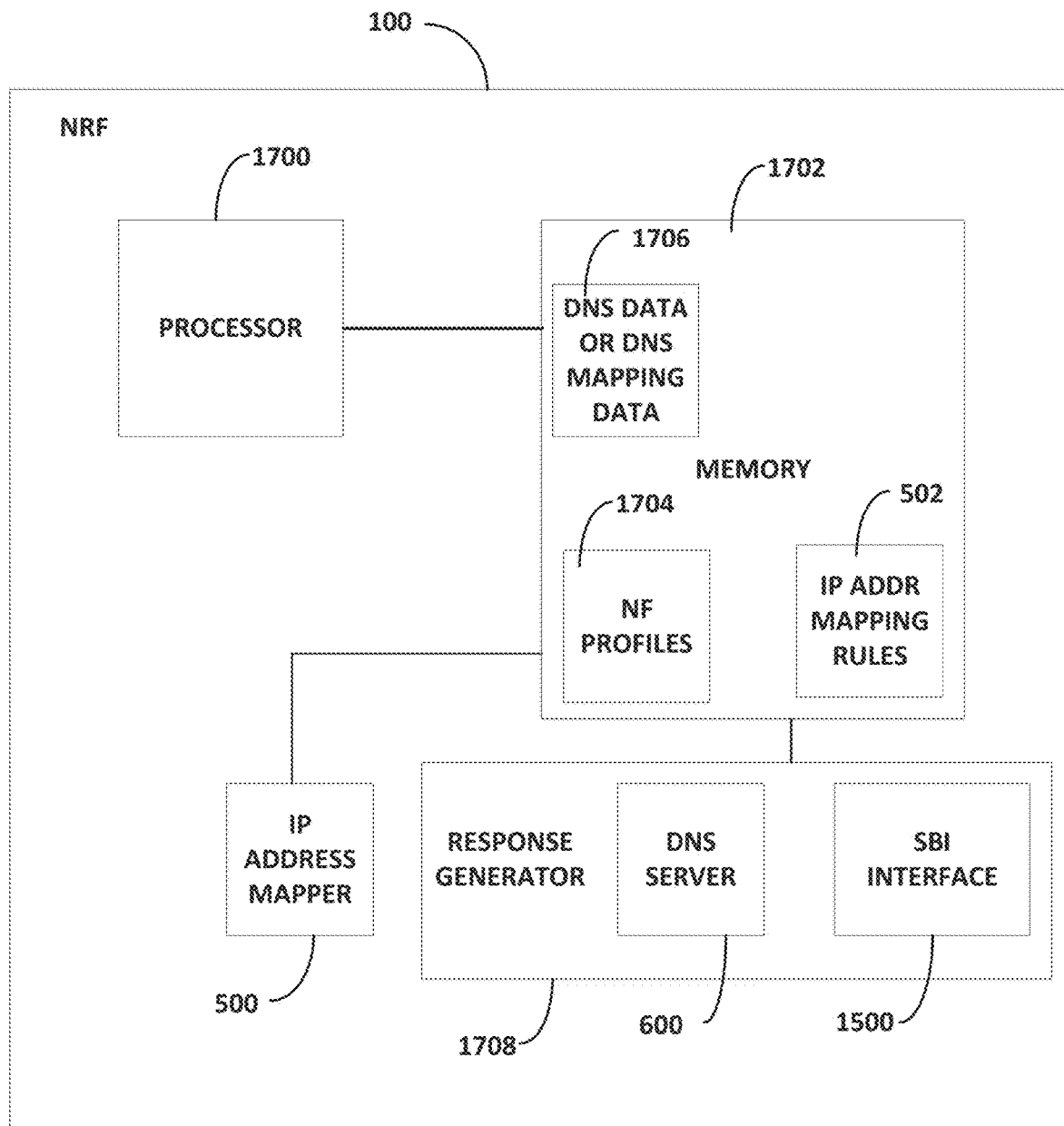
FIG. 17 is a block diagram illustrating an exemplary architecture for and NRF with configurable IP address mapping rules for producer NFs.

FIG. 17 is a block diagram illustrating an exemplary architecture for NRF 100 as described herein. Referring to FIG. 17, NRF 100 includes at least one processor 1700 and a memory 1702. NRF 100 further includes producer NF IP address mapper 500 and producer NF IP address mapping rules 502 described above. NRF 100 also includes NF profiles database 1704 and DNS data or DNS mapping data 1706. NRF 100 further includes a response generator 1708 that includes NRF SBI interface 1500 and NRF DNS server 600.

In operation, when NRF 100 receives an NF discovery request via SBI interface 1500, NRF 100 uses the NF profiles in NF profiles database 1704 to respond to the NF discovery requests along with producer NF IP address mapper 500 and mapping rules 502 to select the IP address to return to a requesting node. Similarly, when responding to a DNS query received via DNS server 600, producer NF IP address mapper 500 may use IP address mapping rules 502 along with DNS data or DNS mapping data 1706 to select an IP address stored in NF profiles database 1704 to provide to DNS server 600 so that DNS server 600 can respond to the DNS queries with IP addresses that are routable to consumer NFs.

Figure 18:
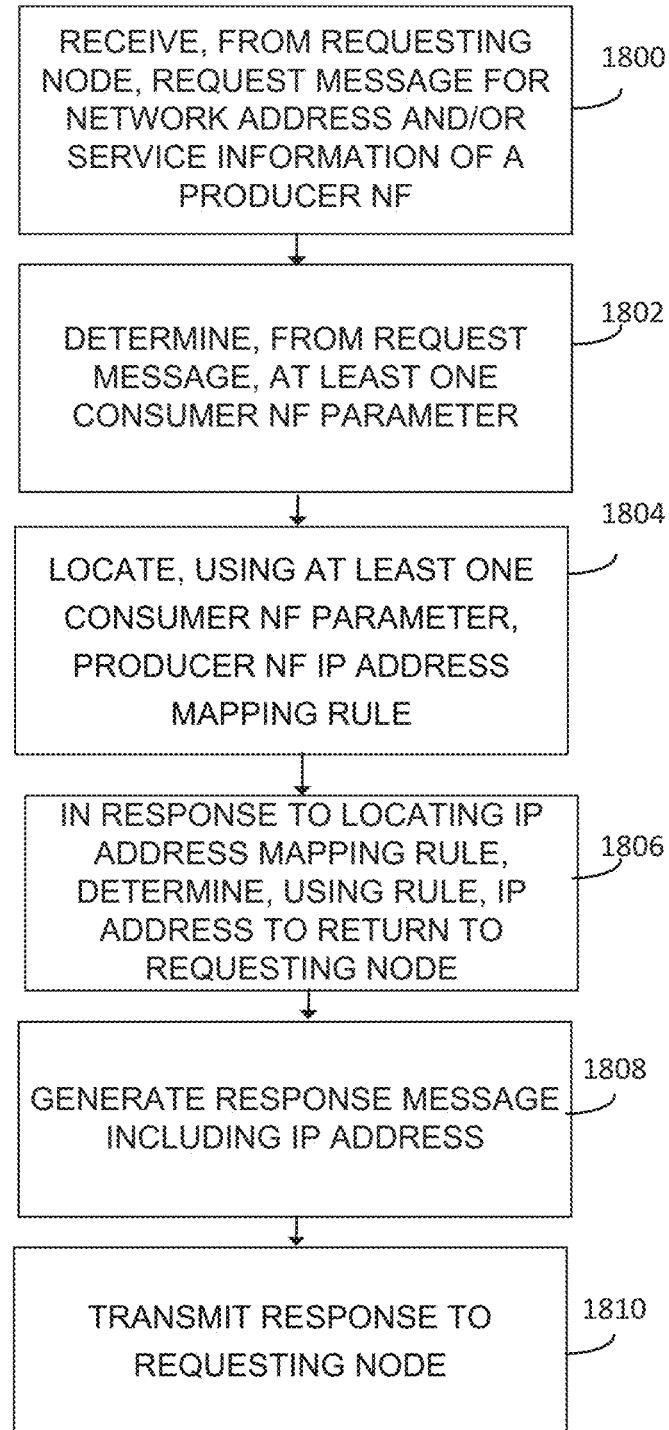
FIG. 18 is a flow chart illustrating an exemplary process that may be performed by an NRF in supporting configurable IP address mapping rules for producer NFs.

FIG. 18 is a flow chart illustrating an exemplary process for supporting configurable producer NF IP address mappings. Referring to FIG. 18, in step 1800, the process includes, at an NF repository function (NRF), receiving, from a requesting node, a request message for network address and/or service information of a producer NF. For example, NRF 100 may receive an NF discovery request message from a consumer NF or an SCP or a DNS resolution request message from a consumer NF, an SCP, or a DNS server.

In step 1802, the process includes determining, from the request message, at least one consumer NF parameter. For example, if the request is an NF discovery request message that includes a requester NF instance ID, NRF 100 may use the requester NF instance ID to locate the NF profile of the consumer NF and obtain the FQDN, IP endpoint address(es), and/or locality from the NF profile. If the request message is a DNS resolution request message or an NF discovery request message without a requester NF instance ID, NRF 100 may use the source IP address of the message as the consumer NF parameter.

In step 1804, the process includes locating, using the at least one consumer NF parameter, a producer NF IP address mapping rule. For example, NRF 100 may use the NF instance ID, FQDN, IP endpoint address(es) and/or source IP address as ConsumerCriteria to locate a matching rule in the ProducerConfigList.

In step 1806, the process includes, in response to locating the producer NF IP address mapping rule, determining, using the producer NF IP address mapping rule, an IP address to return to the requesting node. For example, the matching rule may specify that an IP address of multiple IP addresses in the NF profile should be selected based on locality or other consumer NF attribute. In another example, the matching rule may indicate that a network address translated address should be returned.

In step 1808, the process includes generating a response message including the IP address. For example, if the request message is an NF discovery request, NRF 100 may generate an NF discovery response message including the NF profile of producer NF where the selected IP address is returned as the only IP address in the ipEndPoints attribute of the NF profile, replacing the IP address or addresses that were previously included in the NF profile. If the request message is a DNS resolution request, the response message may include a DNS resolution response message including the selected IP address.

In step 1810, the process includes transmitting the response message to the requesting node. For example, NRF 100 may transmit the response message to the consumer NF, SCP, or DNS server that generated the NF discovery or DNS resolution request.

The disclosure of each of the following references is incorporated herein by reference in its entirety.

REFERENCES

1. $3^{rd}$ Generation Partnership Project; Technical Specification Group Core Network and Terminals; 5G System; Network Function Repository Services; Stage 3 (Release 17) 3GPP TS 29.510 V17.3.0 (September 2021)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for supporting configurable producer network function (NF) Internet protocol (IP) address mappings, the method comprising:
    at an NF repository function (NRF):
        receiving, from a requesting node, a request message for network address and/or service information of a producer NF;
        determining, from the request message, at least one consumer NF parameter;
        locating, using the at least one consumer NF parameter, a producer NF IP address mapping rule;
        in response to locating the producer NF IP address mapping rule, determining, using the producer NF IP address mapping rule, an IP address to return to the requesting node;
        generating a response message including the IP address; and
        transmitting the response message to the requesting node.

2. The method of claim 1 wherein:
    receiving the request message includes receiving an NF discovery request message; and
    determining the IP address to return to the requesting node includes locating an NF profile of the producer NF using at least one query parameter from the NF discovery request message and using the producer NF IP address mapping rule to select the IP address from the NF profile.

3. The method of claim 2 wherein using the producer NF IP address mapping rule to select the IP address includes selecting the IP address from plural IP addresses included in the NF profile.

4. The method of claim 2 wherein using the producer NF IP address mapping rule to select the IP address includes using the producer NF IP address mapping rule to select a network address translated IP address as the IP address to return to the requesting node.

5. The method of claim 2 wherein locating the IP address mapping rule using the at least one consumer NF parameter includes locating the IP address mapping rule using at least one attribute obtained from an NF profile of the consumer NF or a source address of the request message.

6. The method of claim 2 wherein the requesting node comprises a consumer NF or a service communication proxy (SCP).

7. The method of claim 1 wherein:
receiving the request message includes receiving a domain name system (DNS) resolution request message; and
determining the IP address to return to the requesting node includes locating an NF profile of the producer NF using an NF instance identifier mapped to a fully qualified domain name (FQDN) in the DNS resolution request message and using the producer NF IP address mapping rule to select the IP address from the NF profile.

8. The method of claim 7 wherein locating the IP address mapping rule using the at least one consumer NF parameter includes locating the IP address mapping rule using a source IP address of the DNS resolution request message.

9. The method of claim 7 wherein receiving the DNS resolution request message from the requesting node includes receiving the DNS resolution request message from a consumer NF, and SCP, or a DNS server.

10. The method of claim 7 wherein determining the IP address includes selecting the IP address from a plurality of IP addresses included in the NF profile or selecting a network address translated IP address from the NF profile.

11. A system for supporting configurable producer network function (NF) Internet protocol (IP) address mappings, the system comprising:
an NF repository function (NRF) including at least one processor and a memory for receiving, from a requesting node, a request message for network address and/or service information of a producer NF;
a producer NF IP address mapper for determining, from the request message, at least one consumer NF parameter, locating, using the at least one consumer NF parameter, a producer NF IP address mapping rule, in response to locating the producer NF IP address mapping rule, determining, using the producer NF IP address mapping rule, an IP address to return to the requesting node; and
a response generator implemented by the at least one processor for generating a response message including the IP address and transmitting the response message to the requesting node.

12. The system of claim 11 wherein:
the request message includes an NF discovery request message; and
the producer NF IP address mapper is configured to determine the IP address to return to the requesting node by locating an NF profile of the producer NF using at least one query parameter from the NF discovery request message and using the producer NF IP address mapping rule to select the IP address from the NF profile.

13. The system of claim 12 wherein the producer NF IP address mapper is configured use the producer NF IP address mapping rule to select the IP address from plural IP addresses included in the NF profile.

14. The system of claim 12 wherein the producer NF IP address mapper is configured to use the producer NF IP address mapping rule to select a network address translated IP address as the IP address to return to the requesting node.

15. The system of claim 12 wherein the producer NF IP address mapper is configured to locate the IP address mapping rule using at least one attribute obtained from an NF profile of the consumer NF or a source address of the request message.

16. The system of claim 11 wherein:
the request message includes a domain name system (DNS) resolution request message; and
the producer NF IP address mapper is configured to determine the IP address to return to the requesting node by locating an NF profile of the producer NF using an NF instance identifier mapped to a fully qualified domain name (FQDN) in the DNS resolution request message and using the producer NF IP address mapping rule to select the IP address from the NF profile.

17. The system of claim 16 wherein the producer NF IP address mapper is configured to locate the IP address mapping rule using a source IP address of the DNS resolution request message.

18. The system of claim 16 wherein the requesting node comprises a consumer NF, a service communication proxy (SCP), or a DNS server.

19. The system of claim 16 wherein the determining the IP address includes selecting the IP address from a plurality of IP addresses included in the NF profile or selecting a network address translated IP address from the NF profile.

20. A non-transitory computer readable medium having stored thereon executable instructions that when executed by a processor of a computer control the computer to perform steps comprising:
at a network function (NF) repository function (NRF):
receiving, from a requesting node, a request message for network address and/or service information of a producer NF;
determining, from the request message, at least one consumer NF parameter;
locating, using the at least one consumer NF parameter, a producer NF IP address mapping rule;
in response to locating the producer NF IP address mapping rule determining, using the producer NF IP address mapping rule, an IP address to return to the requesting node; and
generating a response message including the IP address; and
transmitting the response message to the requesting node.

* * * * *